(12) United States Patent
Lee

(10) Patent No.: US 12,177,371 B2
(45) Date of Patent: *Dec. 24, 2024

(54) SECURITY DEVICE INCLUDING PHYSICAL UNCLONABLE FUNCTION CELLS, OPERATION METHOD OF SECURITY DEVICE, AND OPERATION METHOD OF PHYSICAL UNCLONABLE FUNCTION CELL DEVICE

(71) Applicant: Samsung Electronics Co., Ltd., Suwon-si (KR)

(72) Inventor: Seungwon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,602

(22) Filed: Aug. 7, 2023

(65) Prior Publication Data

US 2023/0403167 A1 Dec. 14, 2023

Related U.S. Application Data

(60) Continuation of application No. 18/319,871, filed on May 18, 2023, now Pat. No. 11,968,317, which is a division of application No. 16/994,078, filed on Aug. 14, 2020, now Pat. No. 11,695,577.

(30) Foreign Application Priority Data

Nov. 1, 2019 (KR) ........................ 10-2019-0138808

(51) Int. Cl.
*H04L 9/32* (2006.01)
*G06F 21/75* (2013.01)
*H04L 9/08* (2006.01)

(52) U.S. Cl.
CPC ............ *H04L 9/3278* (2013.01); *G06F 21/75* (2013.01); *H04L 9/0877* (2013.01)

(58) Field of Classification Search
CPC ...... H04L 9/3278; H04L 9/0877; G06F 21/75
USPC .......................................................... 713/194
See application file for complete search history.

(56) References Cited

U.S. PATENT DOCUMENTS

| 9,105,432 | B2 | 8/2015 | Kim et al. |
| 9,485,094 | B1* | 11/2016 | Parvarandeh ......... H04L 9/0866 |
| 9,892,783 | B2* | 2/2018 | Yoshimoto ......... G11C 13/0007 |
| 9,916,884 | B2 | 3/2018 | Augustine et al. |

(Continued)

FOREIGN PATENT DOCUMENTS

KR 10-1980964 5/2019

*Primary Examiner* — Dereena T Cattungal
(74) *Attorney, Agent, or Firm* — Fish & Richardson P.C.

(57) ABSTRACT

A security device includes a physical unclonable function (PUF) cell array that includes a plurality of PUF cells connected with a first word line, a controller that selects a target PUF cell of the plurality of PUF cells and outputs a control signal based on the target PUF cell, a decoder that applies a first voltage to the first word line in response to the control signal, a bit line selection circuit that outputs a target current across a bit line connected with the target PUF cell and a sum current corresponding to a sum of currents across the remaining bit lines connected with other PUF cells, and a bit determiner that outputs a target bit of the target PUF cell based on the target current and the sum current, and the security device generates a security key based on the target bit for responding to an authentication requests.

19 Claims, 24 Drawing Sheets

(56) References Cited

U.S. PATENT DOCUMENTS

| | | | |
|---|---|---|---|
| 10,218,517 B2* | 2/2019 | Mai | H04L 9/3278 |
| 10,243,749 B2 | 3/2019 | Park et al. | |
| 11,271,758 B2* | 3/2022 | Lee | G06F 21/71 |
| 2012/0093308 A1* | 4/2012 | Choi | H03K 19/20 |
| | | | 326/104 |
| 2018/0159685 A1 | 6/2018 | Kwak | |
| 2018/0323968 A1 | 11/2018 | Lee et al. | |
| 2019/0058603 A1* | 2/2019 | Lin | H04L 9/0866 |
| 2019/0116052 A1 | 4/2019 | Kim et al. | |

* cited by examiner

SECURITY DEVICE INCLUDING PHYSICAL UNCLONABLE FUNCTION CELLS, OPERATION METHOD OF SECURITY DEVICE, AND OPERATION METHOD OF PHYSICAL UNCLONABLE FUNCTION CELL DEVICE

CROSS-REFERENCE TO RELATED APPLICATIONS

This U.S. non-provisional patent application is a continuation application of U.S. application Ser. No. 18/319,871, filed May 18, 2023, which is a division of U.S. application Ser. No. 16/994,078, filed Aug. 14, 2020, now U.S. Pat. No. 11,695,577, which claims priority under 35 U.S.C. § 119 to Korean Patent Application No. 10-2019-0138808 filed on Nov. 1, 2019, in the Korean Intellectual Property Office, the disclosures of which are incorporated by reference herein in their entireties.

BACKGROUND

1. Technical Field

Embodiments of the inventive concept disclosed herein relate to a security device, and more particularly, relate to a security device including physical unclonable function (PUF) cells, an operation method of the security device, and an operation method of a physical unclonable function cell device.

2. Discussion of Related Art

Technologies associated with security and encryption are important for communication devices and mobile devices. In cryptography, a key is a piece of information that determines the functional output of a cryptographic algorithm. When the key is generated using software on a system connected to a network, a non-authorized user can gain access to the key by hacking into the system. Thus, hardware-based security technologies are being developed.

A physical unclonable function (PUF) based security device generates a unique key randomly based on process, voltage, and temperature (PVT) of the device. However, an error may occur in the key due to various environmental factors. This error reduces the reliability of the PUF device.

SUMMARY

At least one exemplary embodiment of the inventive concept provides a security device including physical unclonable function (PUF) cells having improved reliability and reduced circuit complexity, an operation method of the security device, and an operation method of a physical unclonable function cell device.

According to an exemplary embodiment, a security device includes a physical unclonable function (PUF) cell array that includes a plurality of first PUF cells connected with a first word line, a controller that selects a target PUF cell of the plurality of first PUF cells and outputs a control signal indicating the selected target PUF cell, a decoder that applies a first voltage to the first word line in response to the control signal, a bit line selection circuit that is connected with a plurality of first bit lines and outputs a first target current across a bit line connected with the target PUF cell from among the plurality of first bit lines and a first sum current corresponding to a sum of currents across the remaining bit lines connected with other PUF cells from among the plurality of first PUF cells, and a bit determiner that outputs a target bit of the target PUF cell based on the first target current and the first sum current, and the security device generates a security key based on the target bit for responding to an authentication request.

According to an exemplary embodiment, an operation method of a physical unclonable function (PUF) cell device which includes a plurality of physical unclonable function (PUF) cells includes selecting a target PUF cell of the plurality of PUF cells, applying a first voltage to a first word line connected with the target PUF cell, generating a target value based on a target current corresponding to the target PUF cell and generating a central value based on a sum current corresponding to a sum of currents output from other PUF cells connected with the first word line, determining a target bit of the target PUF cell based on the target value and the central value, and generating a security key based on the target bit for responding to an authentication request.

According to an exemplary embodiment, an operation method of a security device including first to N-th physical unclonable function (PUF) cells includes applying a first voltage to a first word line connected with the first to N-th PUF cells, obtaining first information from the first PUF cell and obtaining second information from the second to N-th PUF cells, determining a first bit of the first PUF cell from the obtained first information and the obtained second information, applying the first voltage to the first word line connected with the first to N-th PUF cells, obtaining third information from the second PUF cell and obtaining fourth information from the first and third to N-th PUF cells, determining a second bit of the second PUF cell based on the obtained third and fourth information, and generating a security key based on the first bit and the second bit for responding to an authentication request, where N is a positive integer.

BRIEF DESCRIPTION OF THE FIGURES

The inventive concept will become apparent by describing in detail exemplary embodiments thereof with reference to the accompanying drawings.

DETAILED DESCRIPTION OF THE EXEMPLARY EMBODIMENTS

Below, embodiments of the inventive concept may be described in detail and clearly to such an extent that one of an ordinary skill in the art can implement the inventive concept.

Components described in the detailed description with reference to terms "part", "unit", "module", "layer", etc. and function blocks illustrated in drawings may be implemented in the form of software, hardware, or a combination thereof. For example, the software may be machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Also, unless differently defined, all terms used herein, which include technical terminologies or scientific terminologies, have the same meaning as that understood by a person skilled in the art to which the inventive concept belongs. Terms defined in a generally used dictionary are to be interpreted to have meanings equal to the contextual meanings in a relevant technical field, and are not interpreted to have ideal or excessively formal meanings unless clearly defined in the specification.

Below, to describe the inventive concept, a number of exemplary components or exemplary numerical values are provided, but the inventive concept is not limited thereto. For example, in drawings below, for brevity of illustration, an example of eight PUF cells connected to one word line is illustrated. However, the inventive concept is not limited thereto since this example is merely for describing the inventive concept.

Figure 1:
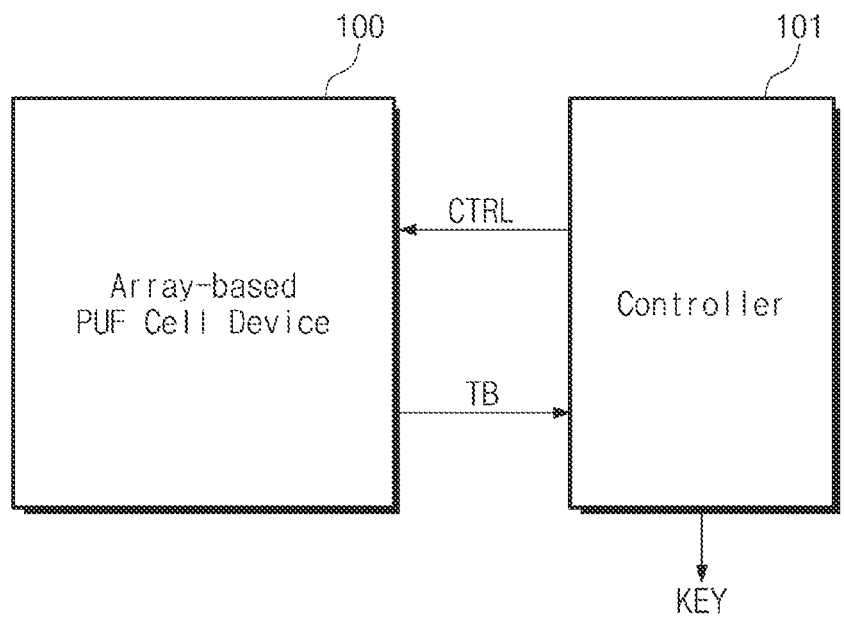
FIG. 1 is a block diagram illustrating a security device according to an exemplary embodiment of the inventive concept.
Figure 2:
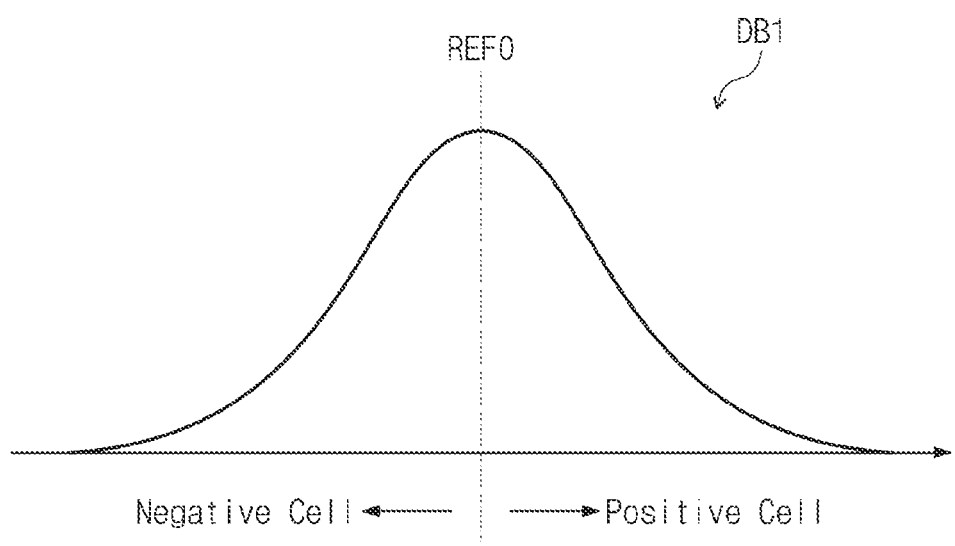
FIG. 2 is a diagram for describing a method of determining a target bit of a PUF cell.

FIG. 1 is a block diagram illustrating a security device according to an exemplary embodiment of the inventive concept. FIG. 2 is a diagram for describing a method of determining a target bit of a PUF cell. A horizontal axis of a distribution of FIG. 2 indicates information (e.g., mismatch information or an amount of current) obtained from PUF cells. Referring to FIGS. 1 and 2, a security device 10 includes an array-based physical unclonable function (PUF) cell device 100 (e.g., a semiconductor device) and a controller 101 (e.g., a control circuit).

The array-based PUF cell device 100 may include a plurality of PUF cells. The plurality of PUF cells may be arranged in the form of an array. Below, for convenience of description, the array-based PUF cell device 100 is simply referred to as a "PUF cell device 100".

In an exemplary embodiment, each of the plurality of PUF cells may be implemented with at least one of various kinds of PUF cells such as a PUF cell based on a threshold voltage of a transistor, an arbiter-based PUF cell (e.g., a feed-forward PUF cell, an XOR PUF cell in which arbiter PUF cells are arranged in parallel, or a lightweight PUF cell), a ring oscillator-based PUF cell, a memory-based PUF cell (e.g., a static random access memory (SRAM) PUF cell, a latch PUF cell, a flash memory PUF cell, or a memistor PUF cell), and a PUF cell reconfigurable according to a laser beam or a thermal variation.

Below, to describe the inventive concept, it is assumed that each of the plurality of PUF cells is a PUF cell based on a threshold voltage of a transistor. However, the inventive concept is not limited thereto. For example, each of the plurality of PUF cells may be implemented with various types of PUF cells.

The PUF cell device 100 is configured to output a target bit TB under control of the controller 101. The controller 101 controls the PUF cell device 100. For example, the controller 101 provides a control signal CTRL to the PUF cell device 100. The control signal CTRL may include information or an address for selecting a target PUF cell of the plurality of PUF cells included in the PUF cell device 100. For example, the control signal may uniquely identify the target PUF cell.

The PUF cell device 100 may select the target PUF cell of the plurality of PUF cells in response to the control signal CTRL received from the controller 101 and may output the target bit TB corresponding to the selected target PUF cell.

The controller 101 may receive target bits TB associated with all or some of the plurality of PUF cells included in the PUF cell device 100 and may generate and output a security key KEY based on the received target bits TB.

In an exemplary embodiment, the plurality of PUF cells may have different process, voltage and temperature (PVT) variations. Even though the same bias (e.g., a bias current, a bias voltage, etc.) is provided to the plurality of PUF cells, each of the plurality of PUF cells may output different information depending on the corresponding PVT variation. For example, even though the plurality of PUF cells are manufactured by the same semiconductor process or on the same wafer, the plurality of PUF cells may have different PVT variations due to various factors (e.g., doping concentration, a thickness of a gate oxide layer, and a geometrical structure).

That is, even though a first PUF cell and a second PUF cell are manufactured by the same semiconductor process or on the same wafer, information output from the first PUF cell may have a positive polarity, and information output from the second PUF cell may have a negative polarity. Alternatively, the size or the value of the information output from the first PUF cell and the size or the value of the information output from the second PUF cell may be different.

A target bit TB associated with each of the plurality of PUF cells may be determined based on the information of each of the PUF cells. For example, pieces of information output from the plurality of PUF cells included in the PUF cell device 100 may form a first distribution DB1 illustrated in FIG. 2. In an exemplary embodiment, the first distribution DB1 may be a Gaussian distribution or a normal distribution. A central value (e.g., a peak) of the first distribution DB1 may be used as a reference value REF0 for determining a polarity of each of the plurality of PUF cells. For example, a PUF cell having information less than the central value can be considered to have a negative polarity and having information greater than or equal the central value can be considered to have a positive polarity.

An exemplary PUF cell device determines a target bit of a target PUF cell by collecting analog information of the target PUF cell, converting the collected analog information into digital data through an analog-to-digital converter, and comparing the converted digital data with reference data (i.e., the reference value REF0).

However, the PUF cell device 100 according to an exemplary embodiment of the inventive concept determines the target bit TB of the target PUF cell without using a separate analog-to-digital converter and separate reference data. For example, the PUF cell device 100 according to an exemplary embodiment of the inventive concept may determines the target bit TB by generating or calculating a central value based on other PUF cells corresponding to the target PUF cell from among the plurality of PUF cells and comparing a target value corresponding to the target PUF cell and the central value. A structure and an operation of the PUF cell device 100 according to an exemplary embodiment of the inventive concept will be described with reference to drawings below.

Figure 3:
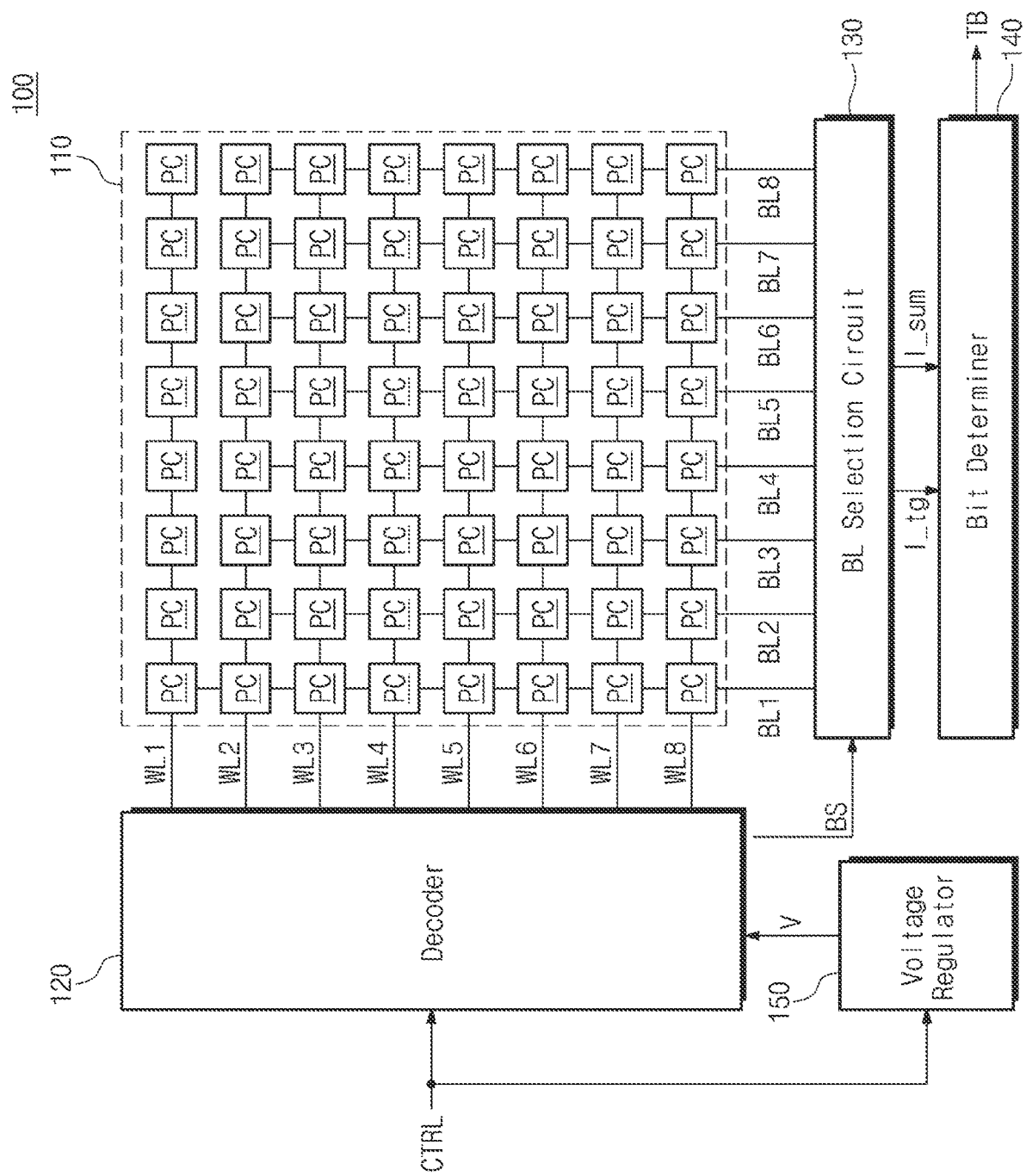
FIG. 3 is a block diagram illustrating a PUF cell device of FIG. 1 according to an exemplary embodiment of the inventive concept.

FIG. 3 is a block diagram illustrating a PUF cell device of FIG. 1 according to an exemplary embodiment of the inventive concept. For brevity of illustration, an example is illustrated as a plurality of PUF cells PC are arranged in an 8×8 matrix, but the inventive concept is not limited thereto. A PUF cell array 110 may further include additional PUF cells, and thus, the number of word lines and the number of bit lines may increase. In an exemplary embodiment, the number of PUF cells PC connected to one word line is at least "N". In this case, "N" indicates the minimum number of PUF cells, of which values form a normal distribution or a Gaussian distribution. In an exemplary embodiment, "N" may range from 4 to 256.

For convenience of description, it is assumed that information obtained from each of the plurality of PUF cells PC is a current generated according to a word line bias of each of the plurality of PUF cells PC. However, the inventive concept is not limited thereto. For example, information obtained from a PUF cell may be variously changed or modified depending on a type of the PUF cell.

Referring to FIGS. 1 and 3, the PUF cell device 100 includes the PUF cell array 110, a decoder 120 (e.g., a decoder circuit), a bit line selection circuit 130, a bit determiner 140 (e.g., a circuit), and a voltage regulator 150.

The PUF cell array 110 includes the plurality of PUF cells PC. The plurality of PUF cells PC may be arranged in a row direction and a column direction to form an array. The plurality of PUF cells PC may be connected with a plurality of word lines WL1 to WL8 and a plurality of bit lines BL1 to BL8. Each of the plurality of PUF cells PC may be configured to output a current depending on a bias (e.g., a bias current, a bias voltage, etc.) of the corresponding word line of the plurality of word lines WL1 to WL8. As described above, a current that is output from each of the plurality of PUF cells PC may have a value that varies depending on a physical characteristic or an ambient condition of each of the plurality of PUF cells PC.

The decoder 120 receives and decodes the control signal CTRL from the controller 101. For example, the control signal CTRL may include address information corresponding to a target PUF cell, of which the target bit TB is to be determined, from among the plurality of PUF cells PC. The decoder 120 decodes the address information corresponding to the target PUF cell and controls the plurality of word lines WL1 to WL8, based on a result of the decoding. The decoder 120 provides a bit line selection signal BS to the bit line selection circuit 130, based on the decoding result. The bit line selection signal BS may be a signal for selecting a bit line corresponding to the target PUF cell from among the plurality of bit lines BL1 to BL8.

The bit line selection circuit 130 receives the bit line selection signal BS from the decoder 120 and controls the plurality of bit lines BL1 to BL8 based on the received bit line selection signal BS. For example, it is assumed that the bit line selection signal BS corresponds to the third bit line BL3. In this case, the bit line selection circuit 130 outputs a signal (e.g., a current) received through the third bit line BL3 as a target current I_tg and outputs a sum of signals (e.g., currents) received from the remaining bit lines BL1, BL2, and BL4 to BL8 as a sum current I_sum.

The bit determiner 140 receives the target current I_tg and the sum current I_sum. The bit determiner 140 determines the target bit TB of the target PUF cell based on the target current I_tg and the sum current I_sum. For example, the bit determiner 140 may divide the sum current I_sum by a given value. In an exemplary embodiment, the given value is a value (e.g., N−1) that is obtained by subtracting "1" from the number of PUF cells PC connected to one word line. That is, as described above, in the case where the target current I_tg is provided from one of PUF cells PC connected with the third bit line BL3 and the sum current I_sum is provided from PUF cells PC (i.e., 7 PUF cells PC) connected with the first, second, and fourth to eighth bit lines BL1, BL2, and BL4 to BL8, the sum current I_sum is divided by "7". That is, the bit determiner 140 calculates an average current of a unit PUF cell based on the sum current I_sum.

The bit determiner 140 compare magnitudes of the calculated average current and the target current I_tg and determines the target bit TB of the target PUF cell depending on a result of the comparison.

The voltage regulator 150 provides a voltage "V" to be applied to the plurality of word lines WL1 to WL8 to the decoder 120. In an exemplary embodiment, bias voltages or active voltages (or bias currents) respectively to be provided to the plurality of word lines WL1 to WL8 have the same level. Alternatively, bias voltages or active voltages respectively to be provided to the plurality of word lines WL1 to WL8 vary depending on physical characteristics of the plurality of PUF cells PC. Alternatively, bias voltages or active voltages respectively to be provided to the plurality of word lines WL1 to WL8 may have different levels such that information collected from the plurality of PUF cells PC form a normal distribution or a Gaussian distribution.

Figure 4:
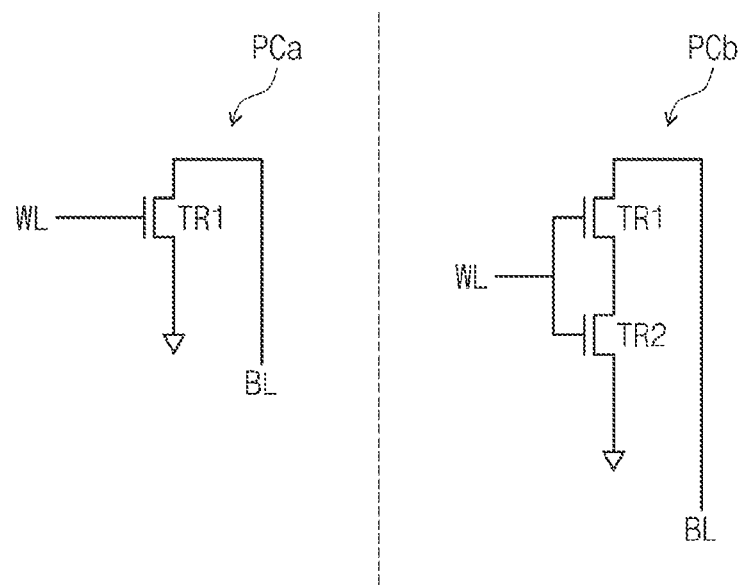
FIG. 4 is a diagram illustrating an exemplary structure of a plurality of PUF cells of FIG. 3.

FIG. 4 is a diagram illustrating an exemplary structure of a plurality of PUF cells of FIG. 3. Referring to FIGS. 3 and 4, any one PUF cell PCa of the plurality of PUF cells PC includes a first transistor TR1. A gate of the first transistor TR1 is connected with a word line WL, a drain thereof is connected with a bit line BL, and a source thereof is connected to receive a particular voltage level. The first transistor TR1 may control the magnitude of a current output to the bit line BL depending on a level of the word line WL. In this case, the magnitude of the current may vary depending on a physical characteristic of the first transistor TR1. That is, even though the plurality of PUF cells PC are formed in the same structure as "PCa" and the same word line bias is applied to each of the plurality of PUF cells PC, a current flowing through the bit line BL may vary depending on a physical characteristic of each PUF cell.

Alternatively, any one PUF cell PCb of the plurality of PUF cells PC includes first and second transistors TR1 and TR2. The first and second transistors TR1 and TR2 are connected in series between a node providing the particular voltage level and the bit line BL and may operate depending on a level of the word line WL. As described above, even though the plurality of PUF cells PC are formed in the same structure as "PCb" and the same word line bias is applied to each of the plurality of PUF cells PC, a current flowing through the bit line BL may vary depending on a physical characteristic of each PUF cell.

The transistor-based PUF cells PCa and PCb described with reference to FIG. 4 are merely for describing the inventive concept and are not intended to limit the inventive concept. The plurality of PUF cells PC may be variously implemented using various structures as described above.

Figure 5:
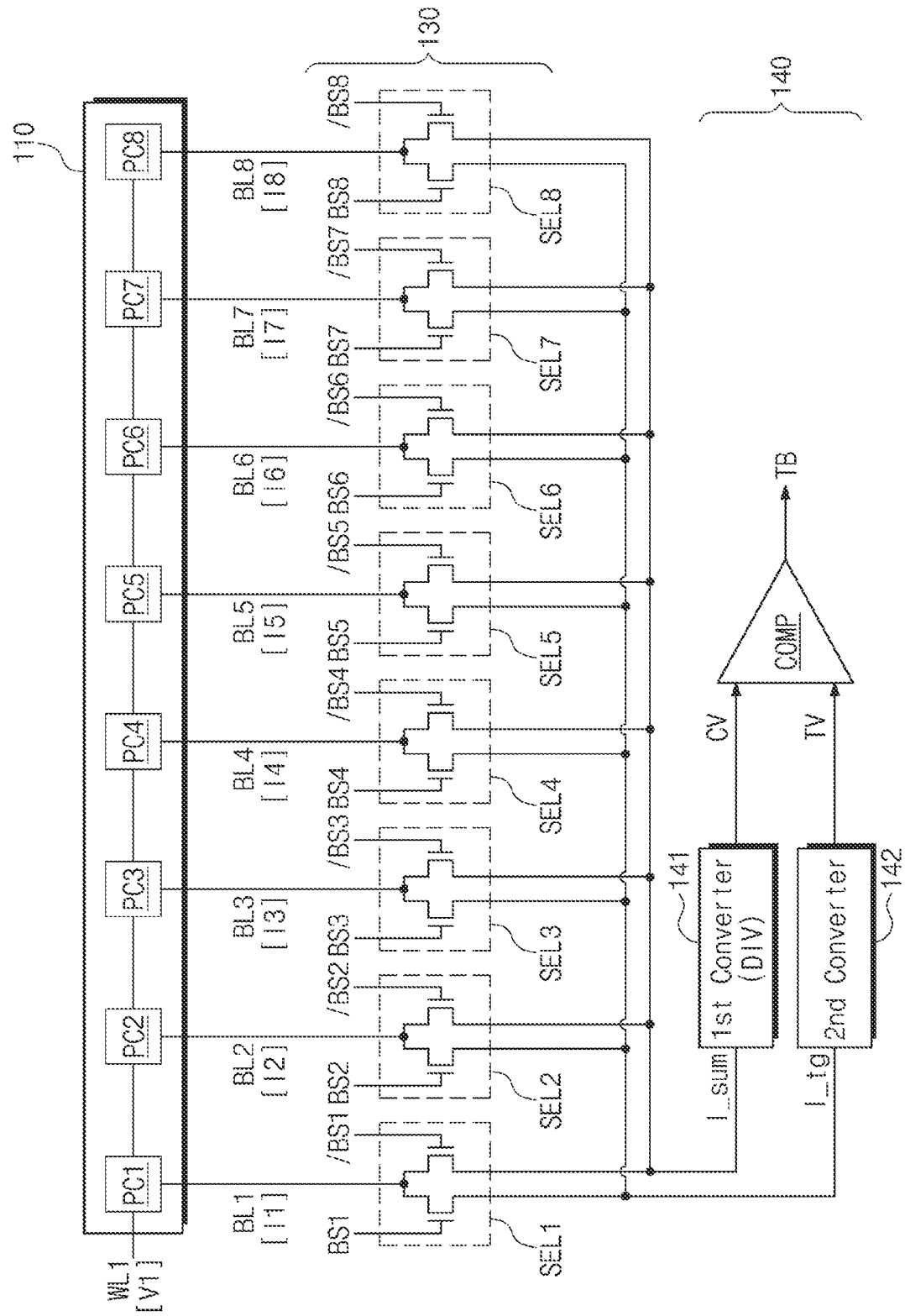
FIG. 5 is a diagram illustrating a configuration of a PUF cell device of FIG. 3 according to an exemplary embodiment of the inventive concept.

FIG. 5 is a diagram illustrating a configuration of a PUF cell device of FIG. 3 according to an exemplary embodiment of the inventive concept. For brevity of illustration, an example is illustrated of the PUF cell array 110 including first to eighth PUF cells PC1 to PC8 connected with the first word line WL1, but the inventive concept is not limited thereto. For example, the PUF cell array 110 may further include additional PUF cells connected with a plurality of word lines and a plurality of bit lines. For brevity of illustration, some components (e.g., the decoder 120 and the voltage regulator 150) are omitted.

Referring to FIGS. 3 and 5, the PUF cell device 100 includes the PUF cell array 110, the bit line selection circuit 130, and the bit determiner 140. The PUF cell array 110 may include the first to eighth PUF cells PC1 to PC8. The first to eighth PUF cells PC1 to PC8 are connected with the first word line WL1. The first to eighth PUF cells PC1 to PC8 are connected with the first to eighth bit lines BL1 to BL8, respectively. The first to eighth PUF cells PC1 to PC8 respectively output first to eighth currents I1 to I8 through the first to eighth bit lines BL1 to BL8 in response to a first voltage V1 provided to the first word line WL1. The first voltage V1 may be provided by the voltage regulator 150.

The bit line selection circuit 130 includes first to eighth selectors SEL1 to SEL8. The first to eighth selectors SEL1 to SEL8 are connected with the first to eighth bit lines BL1 to BL8, respectively. The first to eighth selectors SEL1 to SEL8 operate in response to bit line selection signals BS1 to BS8 and inverted bit line selection signals /BS1 to /BS8.

For example, the first selector SEL1 includes a first transistor configured to provide the first current I1 output from the first bit line BL1 to a second converter 142 of the bit determiner 140 in response to the first bit line selection signal BS1; and a second transistor configured to provide the first current I1 output from the first bit line BL1 to a first converter 141 of the bit determiner 140 in response to the inverted bit line selection signal /BS1. Similar to the above description, the remaining selectors SEL2 to SEL8 may also operate in response to the corresponding bit line selection signals BS2 to BS8 and the corresponding inverted bit line selection signals /BS2 to /BS8, and thus, additional description is omitted to avoid redundancy.

In an exemplary embodiment, each of the bit line selection signals BS1 to BS8 is a signal for selecting a bit line corresponding to a target PUF cell, and each of the inverted bit line selection signals /BS1 to /BS8 is a signal for selecting a bit line corresponding to each of the remaining PUF cells. For example, it is assumed that the target PUF cell is the third PUF cell PC3. In this case, the third bit line selection signal BS3 is activated, and the first, second, and fourth to eighth inverted bit line selection signals /BS1, /BS2, and /BS4 to /BS8 are activated. As such, the third current I3 output through the third bit line BL3 is provided to the second converter 142, and the first, second, and fourth to eighth currents output I1, I2, and I4 to I8 from the first, second, and fourth to eighth bit lines BL1, BL2, and BL4 to BL8 are provided to the first converter 141 as the sum current I_sum.

The bit determiner 140 includes the first converter 141, the second converter 142, and a comparator COMP (e.g., an operational amplifier or other comparison circuit). The first converter 141 may be connected with transistors, which operate in response to the inverted bit line selection signals /BS1 to /BS8, from among transistors included in the plurality of selectors SEL1 to SEL8. The second converter 142 may be connected with transistors, which operate in response to the bit line selection signals BS1 to BS8, from among the transistors included in the plurality of selectors SEL1 to SEL8.

That is, as described above, the first converter 141 receives the sum current I_sum corresponding to a sum of currents output from the remaining PUF cells other than the target PUF cell, and the second converter 142 receives the target current I_tg output from the target PUF cell. The first converter 141 converts the received sum current I_sum to output a central value CV, and the second converter 142 converts the target current I_tg to output a target value TV.

In an exemplary embodiment, the central value CV and the target value TV are voltage levels respectively corresponding to the sum current I_sum and the target current I_tg. That is, the first converter 141 and the second converter 142 may be a current-voltage converter. However, the inventive concept is not limited thereto. For example, each of the first and second converters 141 and 142 may be implemented with a current mirror configured to replicate a received current at a given ratio.

In an exemplary embodiment, the first converter 141 determines the central value CV by dividing the sum current I_sum by a given value. That is, the first converter 141 may provide a function of a divider DIV configured to divide the sum current I_sum by a given value. For example, the first converter 141 may include a divider or divider circuit to divide the sum current I_sum by the given value. For example, as described above, in the case where the target PUF cell is the third PUF cell PC3, the sum current I_sum may be a sum of currents (e.g., I1, I2, and I4 to I8) output from 7 PUF cells (e.g., PC1, PC2, and PC4 to PC8). That is, the first converter 141 may calculate a current value corresponding to the central value CV by dividing the sum current I_sum by "7". In an exemplary embodiment, the central value CV indicates a central value of a normal distribution or a Gaussian distribution that is formed by information obtained from the plurality of PUF cells PC1 to PC8 (however, the number of PUF cells being more than 8) connected with the first word line WL1. That is, in the case where the number of a plurality of PUF cells is a particular number or more (e.g., 4 to 256 or more), the remaining PUF cells of the plurality of PUF cells other than the target PUF cell may form a normal distribution or a Gaussian distribution, and thus, the central value CV may be calculated by using the remaining PUF cells.

In an exemplary embodiment, a division ratio of the first converter 141 is determined based on the number of PUF cells corresponding to the sum current I_sum. In an exemplary embodiment, the division ratio of the first converter 141 may be greater or smaller than the number of PUF cells corresponding to the sum current I_sum as much as a given value.

In an exemplary embodiment, the second converter 142 determines the target value TV without performing a separate division operation on the target current I_tg. Alternatively, the second converter 142 determines the target value TV by dividing the target current I_tg based on a given ratio. In an exemplary embodiment, a second division ratio of the second converter 142 is based on a first division ratio of the first converter 141. In an exemplary embodiment, the second division ratio of the second converter 142 is smaller than the first division ratio of the first converter 141.

The comparator COMP receives the central value CV from the first converter 141 and receives the target value TV from the second converter 142. The comparator COMP compares the central value CV and the target value TV and outputs the target bit TB as a result of the comparison.

As described above, the PUF cell device 100 according to an exemplary embodiment of the inventive concept determines the target bit TB of the target PUF cell by calculating the central value CV using some of the plurality of PUF cells PC without a separate analog-to-digital converter and separate reference data and comparing the calculated central value CV and the target value TV of the target PUF cell. Accordingly, a circuit complexity of the PUF device 100 is decreased, and a PUF cell device 100 having improved reliability may be realized.

Figure 6:
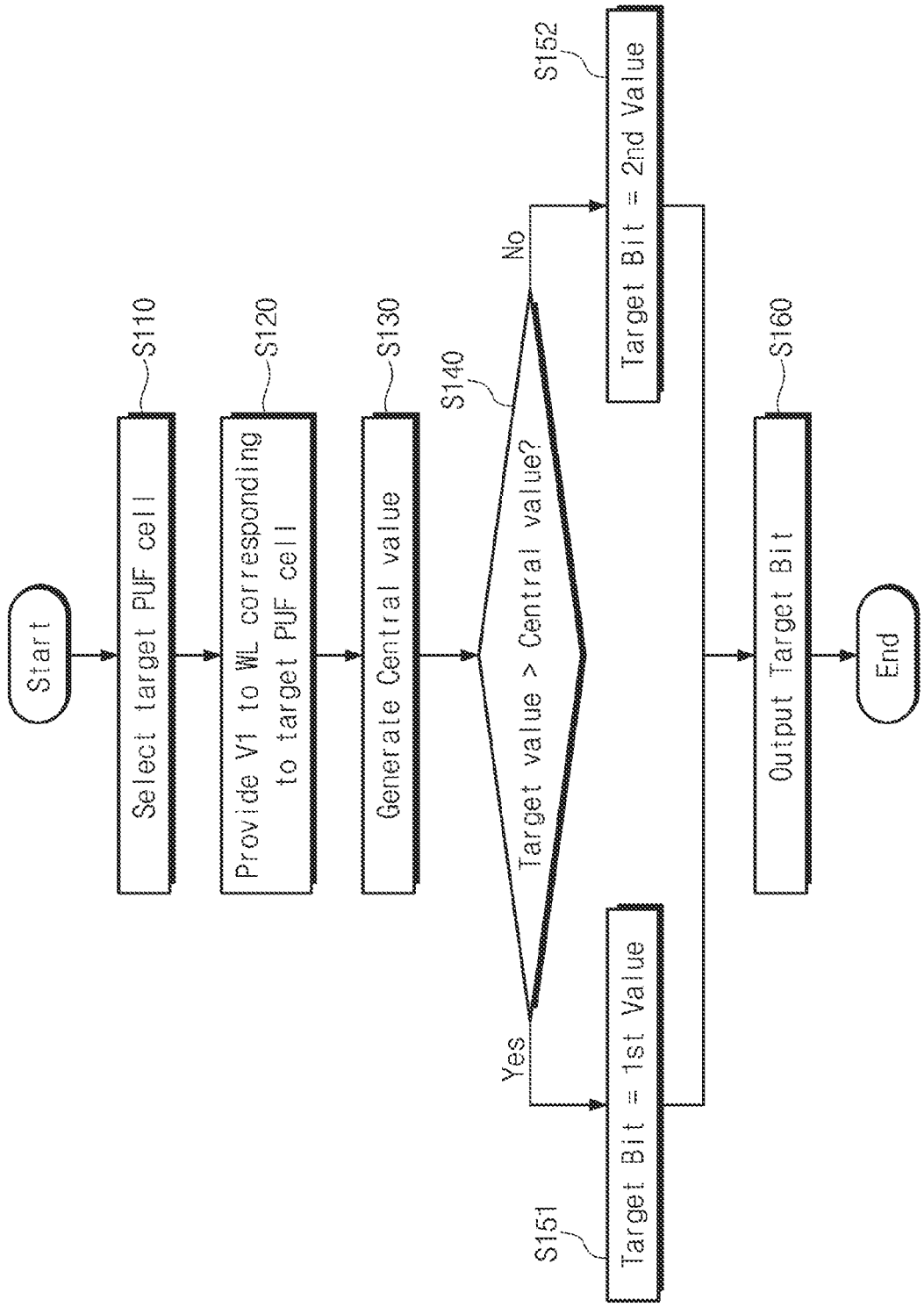
FIG. 6 is a flowchart illustrating an operation of a PUF cell device of FIGS. 3 and 5.

FIG. 6 is a flowchart illustrating an operation of a PUF cell device of FIGS. 3 and 5 according to an exemplary embodiment of the inventive concept. Referring to FIGS. 3, 5, and 6, in operation S110, the PUF cell device 100 selects a target PUF cell. For example, the PUF cell device 100 may receive the control signal CTRL from the controller 101 and may select the target PUF cell of the plurality of PUF cells PC based on the received control signal CTRL.

In operation S120, the PUF cell device 100 provides the first voltage V1 to a word line corresponding to the selected target PUF cell. In an exemplary embodiment, the first voltage V1 may have a level for obtaining different magnitudes of currents from a plurality of PUF cells connected with the first word line WL1.

In operation S130, the PUF cell device 100 generates a central value CV. For example, as described with reference to FIG. 5, the PUF cell device 100 may obtain the sum current I_sum corresponding to a sum of currents from the remaining PUF cells other than a target PUF cell from among the plurality of PUF cells connected with the word line and may generate the central value CV based on the obtained sum current I_sum.

In operation S140, the PUF cell device 100 compares the target value TV and the central value CV. For example, as described with reference to FIG. 5, the target value TV may be a value corresponding to the target current I_tg obtained from the target PUF cell, and the central value CV may be a value generated based on the sum current I_sum obtained from the remaining PUF cells. The PUF cell device 100 may determine whether the target value TV is greater than the central value CV.

When the target value TV is greater than the central value CV, in operation S151, the PUF cell device 100 sets the target bit TB to a first value (e.g., "bit 1"). When the target value TV is smaller than the central value CV, in operation S152, the PUF cell device 100 sets the target bit TB to a second value (e.g., "bit 0") different from the first value. In an exemplary embodiment, when the target value is greater than or equal the central CV, the target bit is set to the first value. In an alternate embodiment, when the target value is less than or equal the central value, the target bit is set to the second value.

In operation S160, the PUF cell device 100 outputs the determined target bit TB.

Figure 7:
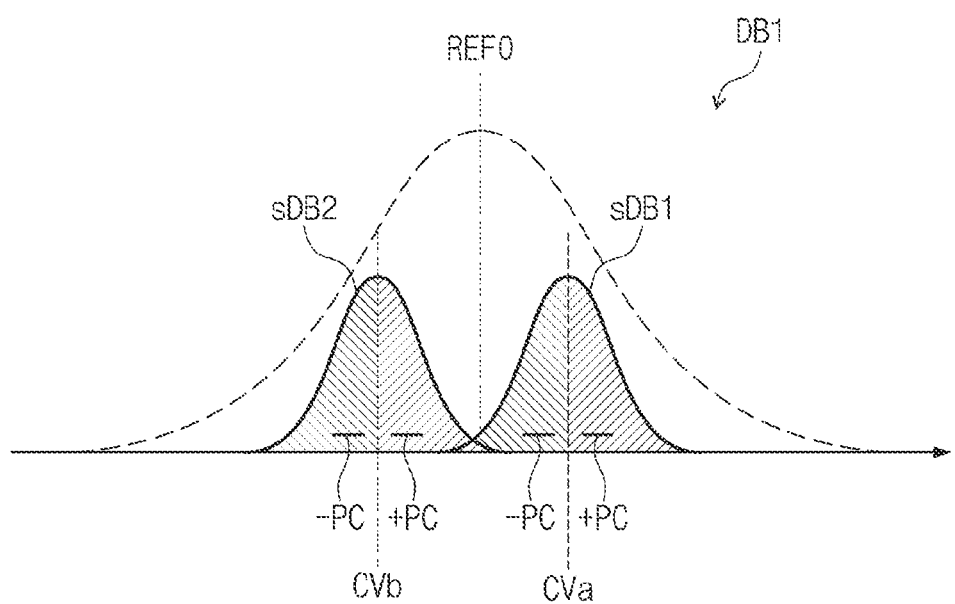
FIG. 7 is a diagram for describing an operation of a PUF cell device of FIG. 3.

FIG. 7 is a diagram for describing an operation of a PUF cell device of FIG. 3. A horizontal axis of a distribution of FIG. 7 indicates information (e.g., mismatch information or the amount of current) obtained from PUF cells.

Referring to FIGS. 3 and 7, information obtained from the plurality of PUF cells PC included in the PUF cell device 100 may form the first distribution DB1. A central value of the first distribution DB1 that is the reference value REF0 is described with reference to FIG. 2, and thus, additional description is omitted to avoid redundancy.

In an exemplary embodiment, information obtained from the plurality of PUF cells PC connected to the first word line WL1 forms a first sub distribution sDB1, and information obtained from the plurality of PUF cells PC connected to the second word line WL2 forms a second sub distribution sDB2. As illustrated in FIG. 7, each of the first and second sub distributions sDB1 and sDB2 may have a shape of a normal distribution or a Gaussian distribution.

That is, in the case where a first target PUF cell is selected from the plurality of PUF cells PC connected to the first word line WL1, an average value of information respectively obtained from the remaining PUF cells other than the target PUF cell from among the plurality of PUF cells PC connected to the first word line WL1 has a first central value CVa. As such, whether the first target PUF cell is a positive PUF cell +PC having a positive polarity or a negative PUF cell −PC having a negative polarity may be determined by comparing a first target value based on information obtained from the first target PUF cell with the first central value CVa.

Likewise, in the case where a second target PUF cell is selected from the plurality of PUF cells PC connected to the second word line WL2, an average value of information respectively obtained from the remaining PUF cells other than the target PUF cell from among the plurality of PUF cells PC connected to the second word line WL2 has a second central value CVb. As such, whether the second target PUF cell is a positive PUF cell +PC having a positive polarity or a negative PUF cell −PC having a negative polarity may be determined by comparing a second target value based on information obtained from the second target PUF cell with the second central value CVb.

As described above, the plurality of PUF cells PC included in the PUF cell device 100 of the inventive concept may form normal or Gaussian distributions that vary depending on biases of word lines. Accordingly, the PUF cell device 100 of the inventive concept may calculate a central value by using PUF cells connected to the same word line as a target PUF cell and may determine a target bit of the target PUF cell based on the calculated central value.

Figure 8:
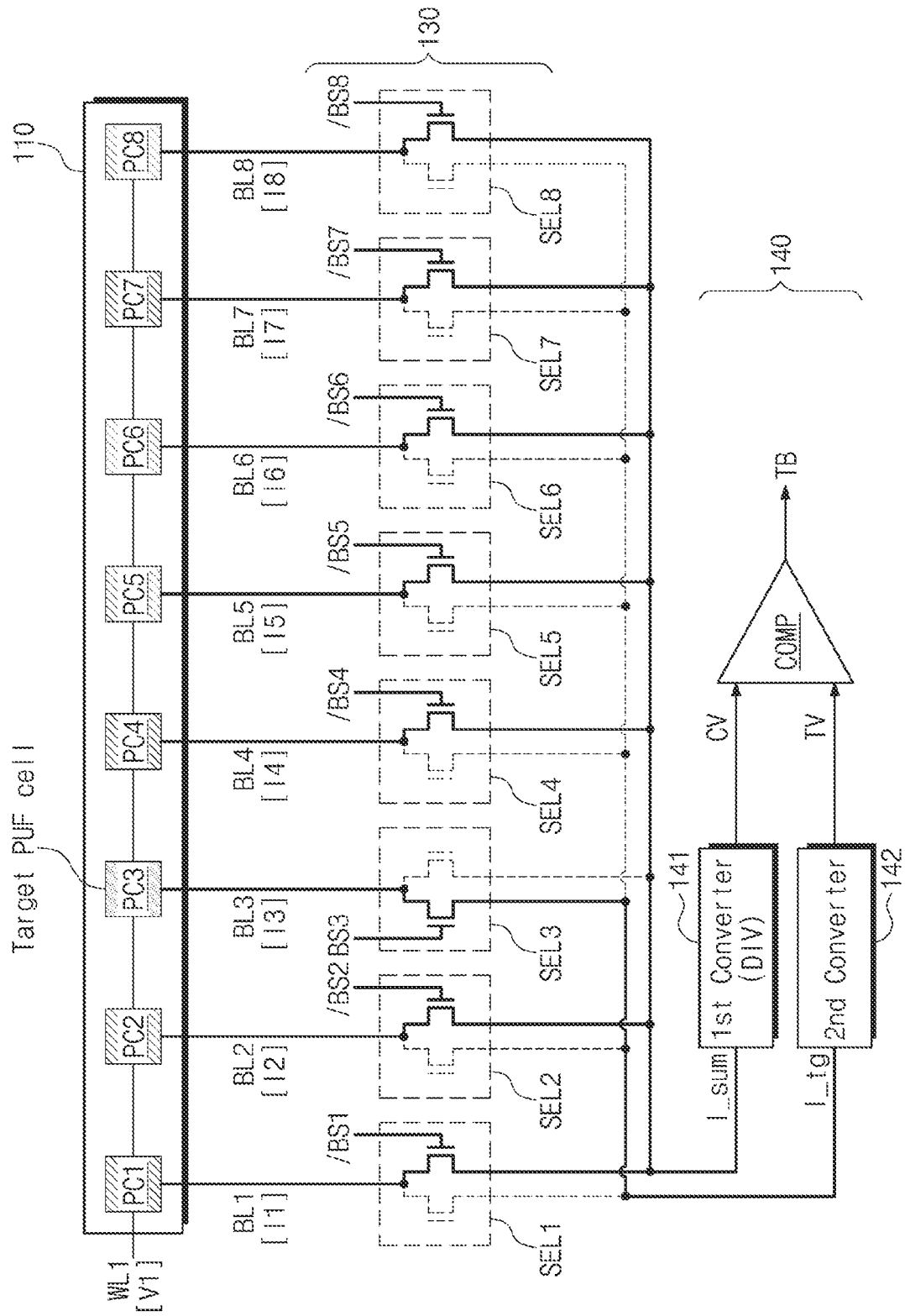
FIG. 8 is a diagram for describing a target bit determining method of a PUF cell device of FIG. 3 according to an exemplary embodiment of the inventive concept.

FIG. 8 is a diagram for describing a target bit determining method of a PUF cell device of FIG. 3 according to an exemplary embodiment of the inventive concept. Referring to FIGS. 3 and 8, the PUF cell device 100 includes the PUF cell array 110, the bit line selection circuit 130, and the bit determiner 140. The PUF cell array 110 includes the plurality of PUF cells PC1 to PC8 connected to the first word line WL1 and the plurality of bit lines BL1 to BL8. The bit line selection circuit 130 includes a plurality of selectors SEL1 to SEL8. The bit determiner 140 includes the first and second converters 141 and 142 and the comparator COMP. The components are described above, and thus, additional description is omitted to avoid redundancy. Also, it is assumed that the third PUF cell PC3 is a target PUF cell.

In the case where the third PUF cell PC3 is selected as a target PUF cell, the first voltage V1 is provided to the first word line WL1 connected with the third PUF cell PC3. In response to the first voltage V1 of the first word line WL1, the plurality of PUF cells PC1 to PC8 output the plurality of currents I1 to I8 through the plurality of bit lines BL1 to BL8, respectively.

Because the third PUF cell PC3 is the target PUF cell, the third bit line selection signal BS3 for selecting the third bit line BL3 connected with the third PUF cell PC3 is activated, and the inverted bit line selection signals /BS1, /BS2, and /BS4 to /BS8 for the remaining bit lines BL1, BL2, and BL4 to BL8 are activated. That is, in response to the third bit line selection signal BS3, the third selector SEL3 provides the third current I3 of the third bit line BL3 to the second converter 142 as the target current I_tg. In response to the first, second, and fourth to eighth inverted bit line selection signals /BS1, /BS2, and /BS4 to /BS8, the first, second, and fourth to eighth selectors SEL1, SEL2, and SLE4 to SEL8 provide the first, second, and fourth to eighth currents I1, I2, and I4 to I8 of the first, second, and fourth to eighth bit lines BL1, BL2, and BL4 to BL8 to the first converter 141 as the sum current I_sum.

The first converter 141 outputs the central value CV based on the sum current I_sum, and the second converter 142 outputs the target value TV based on the third current I3 (i.e., a target current). The comparator COMP compares the central value CV and the target value TV to generate a target bit TB and outputs the target bit TB of the third PUF cell PC3.

Figure 9:
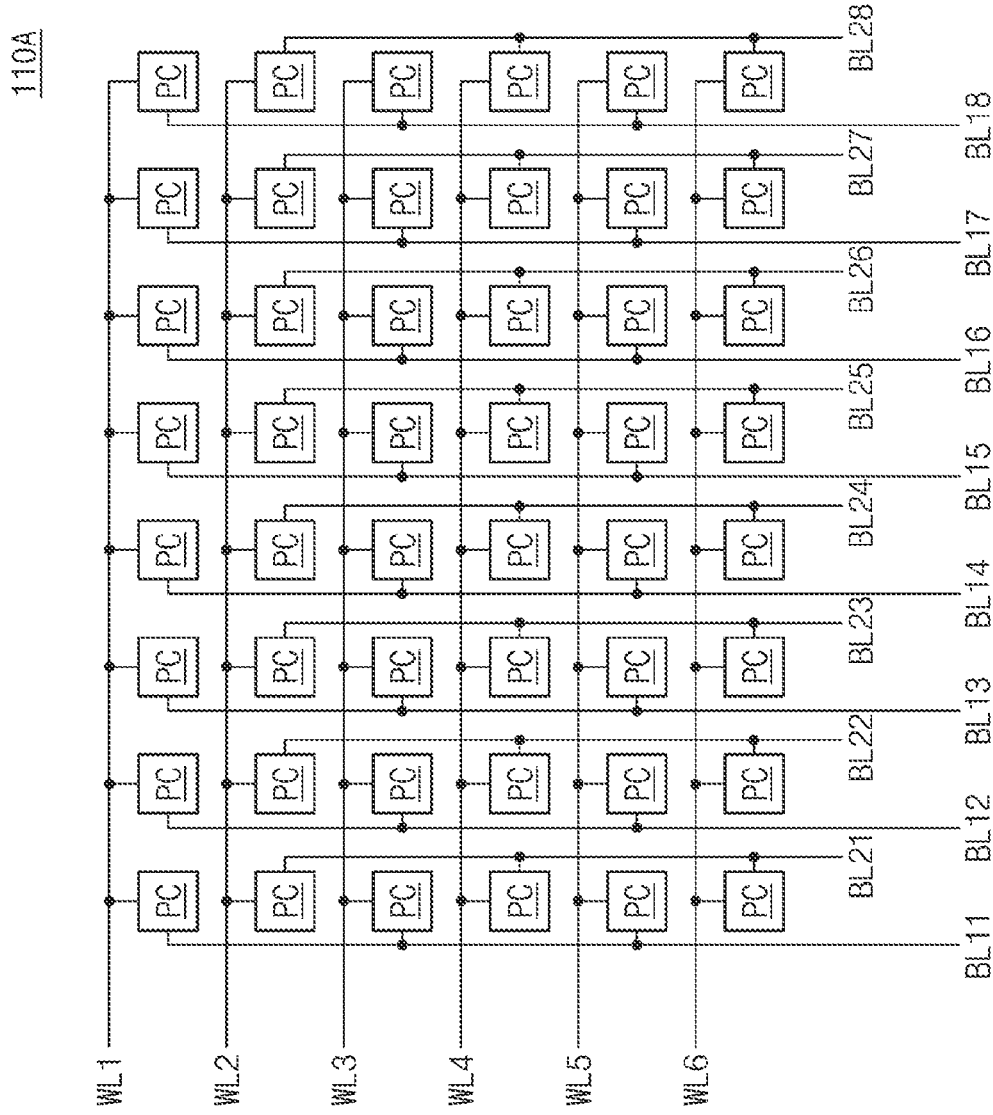
FIG. 9 is a diagram illustrating a PUF cell array according to an exemplary embodiment of the inventive concept.

FIG. 9 is a diagram illustrating a PUF cell array according to an exemplary embodiment of the inventive concept. Referring to FIG. 9, a PUF cell array 110A includes a plurality of PUF cells PC, and the plurality of PUF cells PC are connected with a plurality of word lines WL1 to WL6 and a plurality of bit lines BL11 to BL18 and BL21 to BL28. In an exemplary embodiment, in the PUF cell array 110A, the number of PUF cells, the number of word lines, or the number of bit lines is not limited to the configuration illustrated in FIG. 9.

Unlike the PUF cell array 110 described with reference to FIG. 2, the plurality of PUF cells PC of the PUF cell array 110A of FIG. 9 are connected with the bit lines BL11 to BL18 of a first group and the bit lines BL21 to BL28 of a second group. For example, the PUF cells PC connected with the first, third, and fifth word lines WL1, WL3, and WL5 are connected with the bit lines BL11 to BL18 of the first group, and the PUF cells PC connected with the second, fourth, and sixth word lines WL2, WL4, and WL6 are connected with the bit lines BL21 to BL28 of the second group. That is, the PUF cells PC connected with the first, third, and fifth word lines WL1, WL3, and WL5 and the PUF cells PC connected with the second, fourth, and sixth word lines WL2, WL4, and WL6 are connected with bit lines of different groups and may operate independently of each other.

Figure 10A:
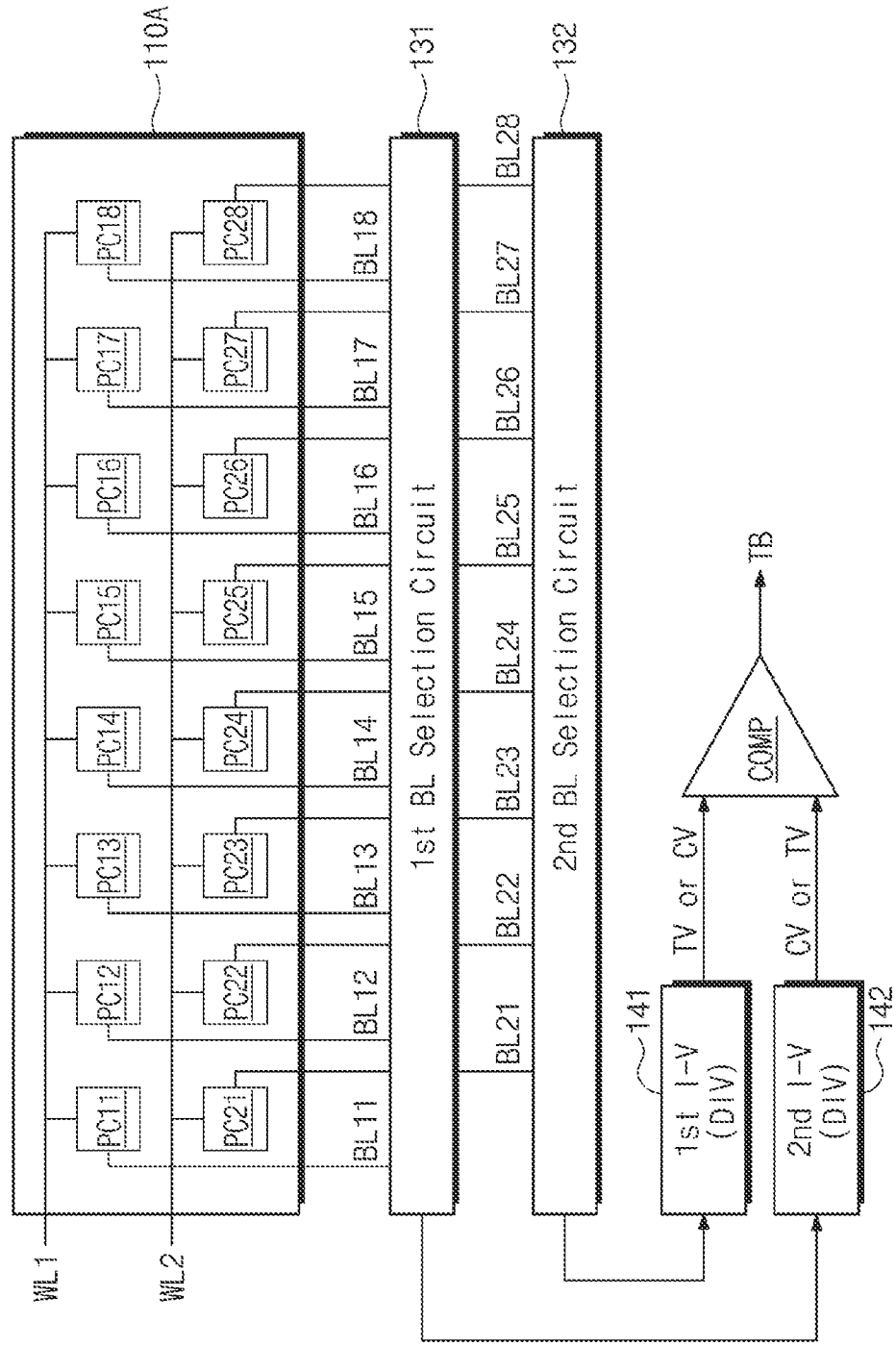
FIG. 10A is a diagram illustrating an exemplary PUF cell device to which a PUF cell array of FIG. 9 is applied.
Figure 10B:
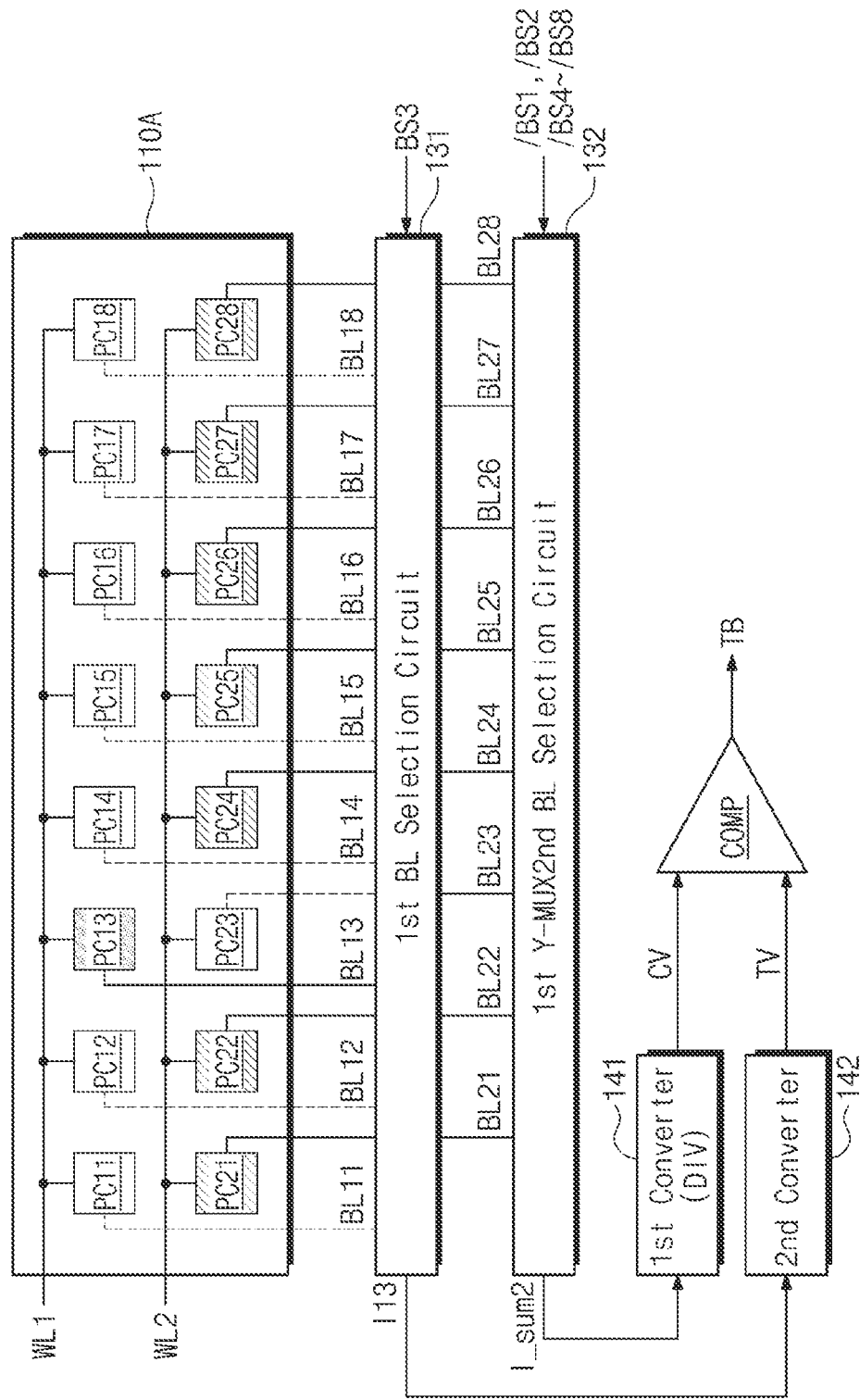
FIGS. 10B to 10D are diagrams for describing an operation of a PUF cell device of FIG. 10A according to an exemplary embodiment of the inventive concept.
Figure 10C:
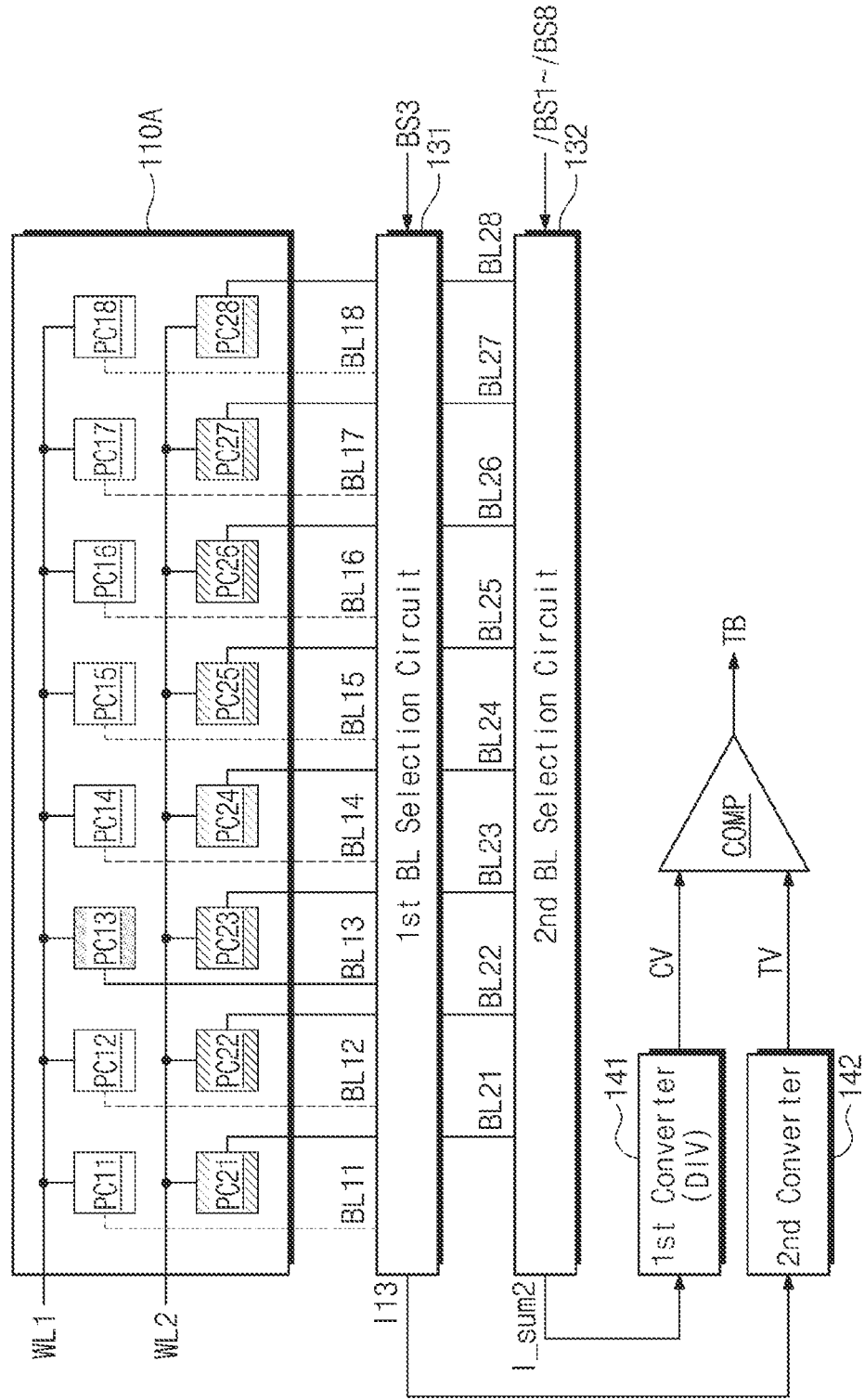
Figure 10D:
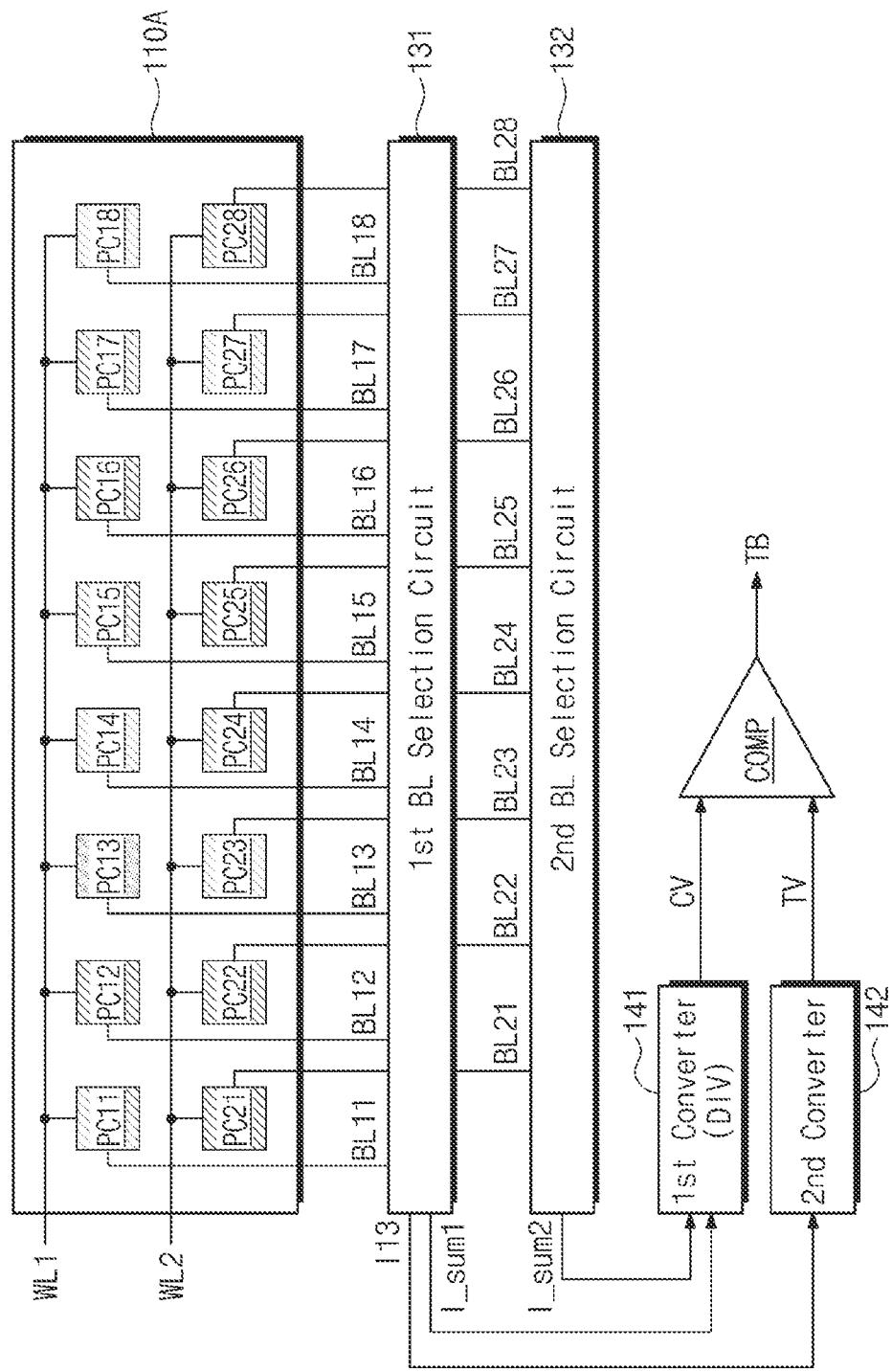

FIG. 10A is a diagram illustrating a PUF cell device to which a PUF cell array of FIG. 9 is applied. FIGS. 10B to 10D are diagrams for describing an operation of a PUF cell device of FIG. 10A. For brief description, components that are the same as the components described above are not described.

Referring to FIGS. 10A to 10D, a PUF cell device includes the PUF cell array 110A, first and second bit line selection circuits 131 and 132, and a bit determiner (e.g., a comparator COMP). The PUF cell array 110A include the plurality of PUF cells PC11 to PC18 and PC21 to PC28. The plurality of PUF cells PC11 to PC18 and PC21 to PC28 may be connected with the first and second word lines WL1 and WL2. The PUF cells PC PC11 to PC18 connected with the first word line WL1 are connected with the bit lines BL11 to BL18 of a first group, and the PUF cells PC21 to PC28 connected with the second word line WL2 are connected with the bit lines BL21 to BL28 of a second group.

The first bit line selection circuit 131 is connected with the bit lines BL11 to BL18 of the first group. In an exemplary embodiment, the first bit line selection circuit 131 includes selectors described with reference to FIGS. 5 and 8. The selectors included in the first bit line selection circuit 131 are respectively connected with the bit lines BL11 to BL18 of the first group and operate in response to the corresponding bit line selection signals or the corresponding inverted bit line selection signals. The second bit line selection circuit 132 is connected with the bit lines BL21 to BL28 of the second group. In an exemplary embodiment, the second bit line selection circuit 132 includes selectors described with reference to FIGS. 5 and 8. The selectors included in the second bit line selection circuit 132 are respectively connected with the bit lines BL21 to BL28 of the second group and operate in response to the corresponding bit line selection signals or the corresponding inverted bit line selection signals. For brevity of illustration and for convenience of description, the detailed configuration and operation of the selectors are described above, and thus, additional description is omitted to avoid redundancy.

The first converter 141 outputs the target value TV or the central value CV based on information (e.g., a current) received from the second bit line selection circuit 132. The second converter 142 outputs the central value CV or the target value TV based on information (e.g., a current) received from the first bit line selection circuit 131.

In an exemplary embodiment, the first bit line selection circuit 131 provides a target current or a sum current to the second converter 142, and the second bit line selection circuit 132 provides a sum current or a target current to the first converter 141.

For example, as illustrated in FIG. 10B, it is assumed that the PUF cell PC13 connected with the first word line WL1 is a target PUF cell. In this case, the first voltage V1 is applied to the first and second word lines WL1 and WL2. In an exemplary embodiment, voltages that are applied to the first and second word lines WL1 and WL2 may be differently set depending on physical characteristics of the plurality of PUF cells PC11 to PC18 and PC21 to PC28 connected with the first and second word lines WL1 and WL2. In response to the first voltage V1 applied to the first and second word lines WL1 and WL2, each of the plurality of PUF cells PC11 to PC18 and PC21 to PC28 output a corresponding current.

The first bit line selection circuit 131 provides the second converter 142 with the current I13 output from the PUF cell PC13 connected with the first word line WL1 and the third bit line BL13 of the first group in response to the third bit line selection signal BS3. In this case, the current I13 is the target current I_tg. The second converter 142 outputs the target value TV based on the target current I_tg.

In response to the inverted bit line selection signals /BS1, /BS2, and /BS4 to /BS8, the second bit line selection circuit 132 provides the first converter 141 with the sum current I_sum2 corresponding to a sum of currents provided through some bit lines BL21, BL22, and BL24 to BL28 of the second group. The first converter 141 outputs the central value CV based on the sum current I_sum2 provided from the second bit line selection circuit 132. The comparator COMP compares the central value CV and the target value TV to generate a target bit TB and outputs the target bit TB of the third PUF cell PC3 as a comparison result.

As described above, the PUF cell device according to an exemplary embodiment of the inventive concept calculates the central value CV based on a sum current obtained from some of PUF cells connected with a second word line different from a first word line corresponding to a target PUF cell. In this case, the some PUF cells may indicate PUF cells, which are connected with remaining bit lines other than the corresponding bit line to the target PUF cell, from among the PUF cells connected with the different word line. That is, in the embodiment of FIG. 10B, in the case where the target PUF cell is connected with the third bit line BL13 of the first group, PUF cells that are used to calculate the central value CV are the PUF cells PC21, PC22, and PC24 to PC28 connected with the second word line WL2 and the first, second, and fourth to eighth bit lines BL21, BL22, and BL24 to BL28 of the second group.

However, the inventive concept is not limited thereto. For example, as illustrated in FIG. 10C, in the case where a target PUF cell (e.g., PC13) is connected with the first word line WL1, all the PUF cells PC21 to PC28 connected with the second word line WL2 may be used to calculate the central value CV. In this case, a target bit determining operation is similar to that described above except that the second bit line selection circuit 132 receives the first to eighth inverted bit line selection signals /BS1 to /BS8 and all the PUF cells PC21 to PC28 connected with the second word line WL2 are used to calculate the central value CV, and thus, additional description is omitted to avoid redundancy.

However, the inventive concept is not limited thereto. For example, as illustrated in FIG. 10D, in the case where a target PUF cell (e.g., PC13) is connected with the first word line WL1, all the remaining PUF cells PC11, PC12, PC14 to PC18, and PC21 to PC28 other than the target PUF cell PC13 from among the plurality of PUF cells PC11 to PC18 and PC21 to PC28 connected with the first and second word lines WL1 and WL2 are used to calculate the central value CV. In this case, the second bit line selection circuit 132 provides the first converter 141 with a second sum current I_sum2 corresponding to a sum of currents from the PUF cells PC21 to PC28 connected with the second word line WL2, and the first bit line selection circuit 131 provides the first converter 141 with a first sum current I_sum1 corresponding to a sum of currents from the remaining PUF cells PC11, PC12, and PC14 to PC18 other than the target PUF cell PC3 from among the PUF cells PC11 to PC18 connected with the first word line WL1. The first converter 141 outputs the central value CV based on both the first sum current I_sum1 and the second sum current I_sum2.

In an exemplary embodiment, a division ratio of the first converter 141 or the second converter 142 may vary depending on the number of PUF cells to be used to calculate the central value CV.

The above exemplary embodiments are provided for describing the inventive concept and are not intended to limit the inventive concept. For example, in a PUF cell device, the number of PUF cells, the number of word lines, or the number of bit lines may be variously changed or modified. Also, PUF cells that are used to calculate the central value CV may be variously constructed depending on a structure of a PUF cell array. For example, an embodiment in which a central value is calculated by using PUF cells of a word line adjacent to a word line of a target PUF cell is described with reference to FIGS. 10A to 10D, but PUF cells of a word line physically spaced from a word line of a target PUF cell may be used to calculate a central value. Alternatively, a plurality of PUF cells connected with a plurality of word lines may be used to calculate a central value.

Figure 11:
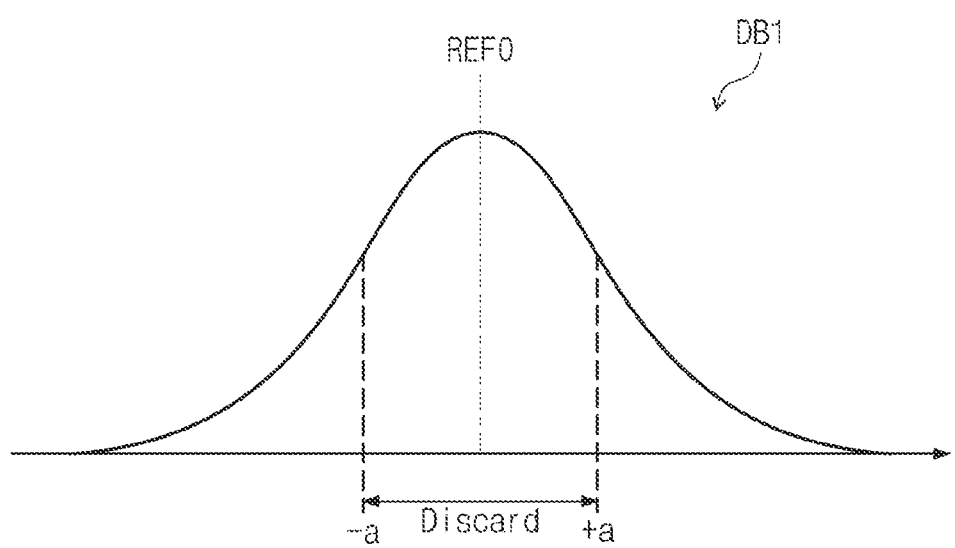
FIG. 11 is a diagram for describing a way to improve reliability of a PUF cell device.

FIG. 11 is a diagram for describing a way to improve reliability of a PUF cell device. Referring to FIG. 11, as described above, information obtained from a plurality of PUF cells of a PUF cell device may form a normal distribution or a Gaussian distribution like the first distribution DB1, and the target bit TB or a polarity of a PUF cell may determined based on the reference value REF0. Information that are output from PUF cells may vary depending on various conditions (e.g., an operating temperature and an operating voltage). That is, in the PUF cell that outputs information close to the reference value REF0, the output information may vary depending on various factors, and thus, a polarity or a determination bit of the PUF cell may be changed. This causes reliability of the PUF cell device to decrease.

As such, an exemplary PUF cell device may collect information of each of a plurality of PUF cells included in the PUF cell device through a separate test operation, may convert the collected information into digital data through an analog-to-digital converter, and may discard PUF cells having information between the reference value REF0 and "−a" or "+a". For example, PUF cells having information ranging from REF0−a to REF0+a may be discarded (or ignored). That a particular PUF cell is discarded means that the particular PUF cell is not selected as a target PUF cell in a next PUF cell operation. That is, the overall reliability of the PUF cell device may be improved by discarding (or ignoring) PUF cells PC of relatively low reliability.

However, as described above, to discard PUF cells PC of relatively low reliability, operations such as converting information of all PUF cells into digital data through an analog-to-digital converter and setting a separate reference value REF0 are required.

The PUF cell device 100 according to an exemplary embodiment of the inventive concept determines and discards unstable PUF cells by adjusting a division ratio for the central value CV and determining a target bit based on the adjusted division ratio.

Figure 12A:
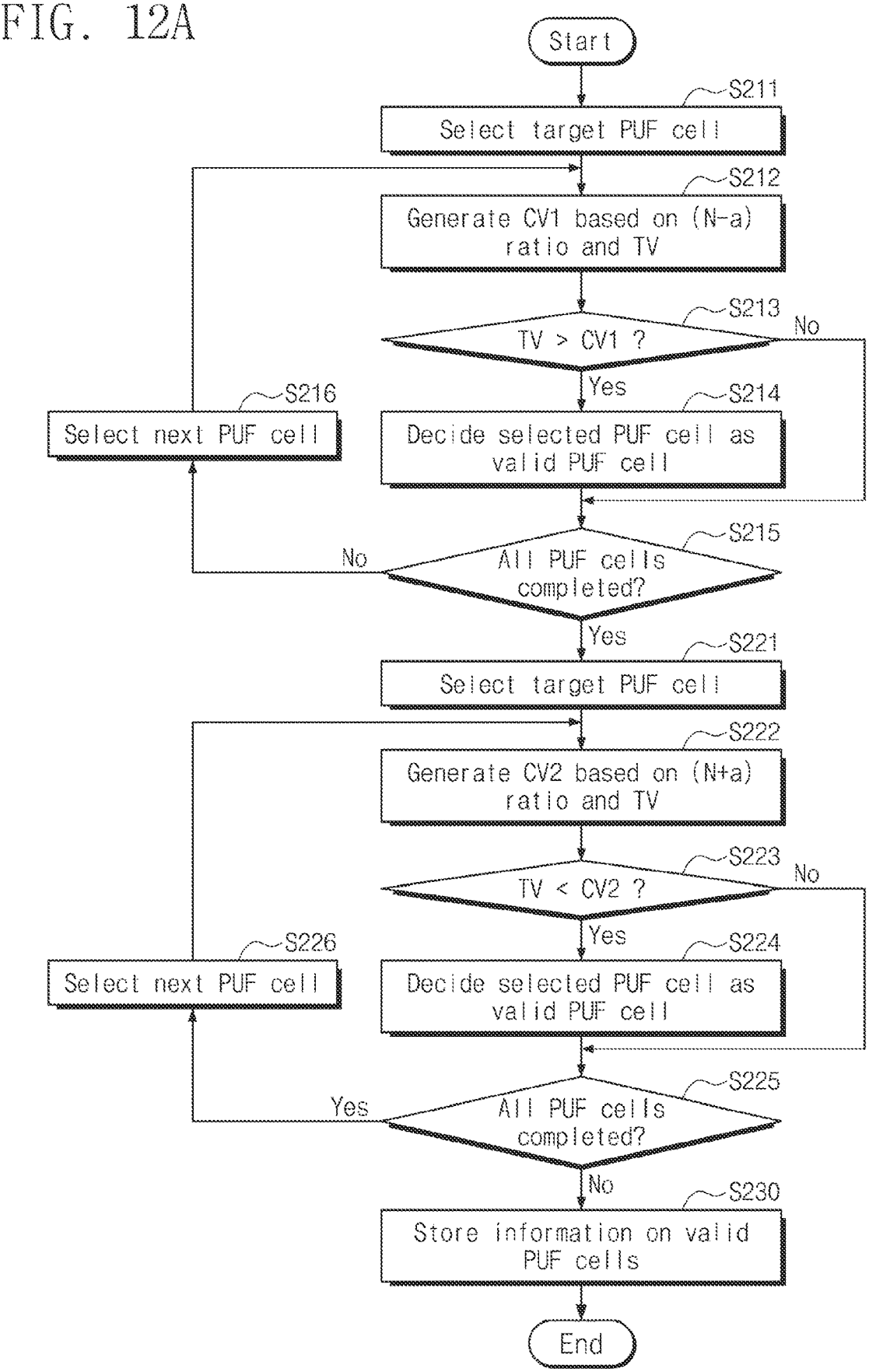
FIG. 12A is a flowchart for describing an operation of an unstable PUF cell or a valid PUF cell of a PUF cell device of FIG. 1 according to an exemplary embodiment of the inventive concept.
Figure 12B:
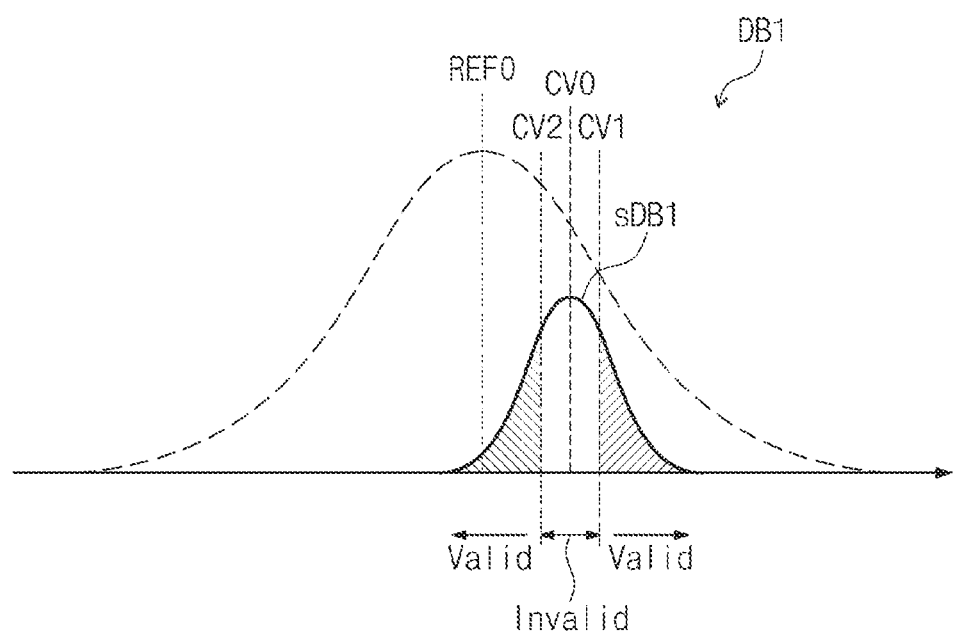
FIG. 12B is a diagram for describing an operation of an unstable PUF cell or a valid PUF cell of a PUF cell device of FIG. 1.

FIG. 12A is a flowchart for describing an operation of an unstable PUF cell or a valid PUF cell of a PUF cell device of FIG. 1 according to an exemplary embodiment of the inventive concept. FIG. 12B is a diagram for describing an operation of an unstable PUF cell or a valid PUF cell of a PUF cell device of FIG. 1. Referring to FIGS. 1, 2, 12A, and 12B, in operation S211, the PUF cell device 100 selects a target PUF cell. For example, the PUF cell device may select a target PUF cell based on a received control signal.

In operation S212, the PUF cell device 100 generates the target value TV and generates a first central value CV1 based on a first division ratio "N−a". In an exemplary embodiment, "N" is a positive integer, and "a" is a real number. For example, the PUF cell device 100 may generate the target value TV corresponding to the target PUF cell and the first central value CV1 based on the operation method described with reference to FIGS. 1 to 10D. In this case, a division ratio for the first central value CV1 may be smaller than a given division ratio. For example, in the case where a central value is calculated by using "N" PUF cells, in the above embodiments, a 0-th central value CV0 is calculated based on a division ratio of "N". However, in operation S212, in the case of calculating a central value by using the "N" PUF cells, the central value is calculated based on a division ratio of "N−a" (i.e., a division ratio smaller than in the above embodiments). In this case, as illustrated in FIG. 12B, the first central value CV1 calculated based on the division ratio of "N−a" is greater than the 0-th central value CV0 calculated based on the division ratio of "N".

In operation S213, the PUF cell device 100 compares the target value TV and the first central value CV1. When the target value TV is not greater than the first central value CV1, the PUF cell device 100 proceeds to operation S215. When the target value TV is greater than the first central value CV1, in operation S214, the PUF cell device 100 decides the selected target PUF cell as a valid PUF cell. For example, as illustrated in FIG. 12B, that the target value TV is greater than the first central value CV1 may mean that the target value TV is spaced from the 0-th central value CV0 a certain distance (e.g., a logical distance). That is, even though information output from the target PUF cell varies depending on various ambient conditions, the probability that the target value TV of the target PUF cell is lower than the 0-th central value CV0 may be very low. That is, the target PUF cell having the target value TV greater than the first central value CV1 is a stable (or valid) PUF cell.

When it is determined after operation S214 or in operation S213 that the target value TV is not greater than the first central value CV1, in operation S215, the PUF cell device 100 determines whether the above operation has been completely performed on all the PUF cells. When it is determined that the above operation has not been completely performed on all the PUF cells, in operation S216, the PUF cell device 100 selects a next target PUF cell. Afterwards, the PUF cell device 100 may repeat operation S212 to operation S216.

As described above, by performing operation S211 to operation S216, the PUF cell device 100 of the inventive concept calculates the first central value CV1 (i.e., greater than the 0-th central value) by using a division ratio smaller than a given division ratio and decides PUF cells having a target value greater than the first central value CV1 as valid PUF cells.

In operation S221, the PUF cell device 100 selects a target PUF cell. In operation S222, the PUF cell device 100 generates the target value TV and generates a second central value CV2 based on a second division ratio "N+a". For example, the PUF cell device 100 generates the target value TV corresponding to the target PUF cell and the second central value CV2 based on the operation method described with reference to FIGS. 1 to 10D. In this case, as described above, in the case where a central value is calculated by using "N" PUF cells, the 0-th central value CV0 is calculated based on the division ratio of "N". In contrast, in operation S222, the second central value CV2 is calculated based on the division ratio of "N+a" greater than the division ratio of "N". In this case, the second central value CV2 is smaller than the 0-th central value CV0 as illustrated in FIG. 12B.

In operation S223, the PUF cell device 100 determines whether the target value TV is smaller than the second central value CV2.

When the target value TV is not smaller than the second central value CV2, the PUF cell device 100 proceeds to operation S225. When the target value TV is smaller than the second central value CV2, in operation S224, the PUF cell device 100 decides the selected target PUF cell as a valid PUF cell. For example, as illustrated in FIG. 12B, that the target value TV is smaller than the second central value CV2 means that the target value TV is spaced from the 0-th central value CV0 a certain distance (e.g., a logical distance). That is, even though information output from the target PUF cell varies depending on various ambient conditions, the probability that the target value TV of the target PUF cell is higher than the 0-th central value CV0 may be very low. That is, the target PUF cell having the target value TV smaller than the second central value CV2 may be a stable (e.g., a valid) PUF cell.

Afterwards, the PUF cell device 100 may perform operation S225 and operation S226. Operation S225 and operation S226 are similar to operation S215 and operation S216 described above, and thus, additional description is omitted to avoid redundancy.

As described above, by performing operation S221 to operation S226, the PUF cell device 100 of an inventive concept calculates the second central value CV2 (i.e., smaller than the central value) by using a division ratio greater than a given division ratio and may decide PUF cells having a target value smaller than the second central value CV2 as valid PUF cells.

Afterwards, in operation S230, the PUF cell device 100 stores information about valid PUF cells. For example, the PUF cell device 100 may store address information about valid PUF cells. In this case, because the stored information is simply address information of valid PUF cells and other information about polarities or target values of the valid PUF cells (i.e., information capable of deciding a bit value) is not separately stored, even if the address information is leaked out or hacked, it is not possible to restore a target value or a security key.

For brevity of illustration and convenience of description, operation S230 is separately illustrated, but the inventive concept is not limited thereto. For example, operation S230 may be individually performed in operation S214 or operation S224. Alternatively, operation S230 may be performed by the controller 101. For example, depending on a result of operation S213, a first value or a second value may be output as the target bit TB of the target PUF cell. The controller 101 may decide a target PUF cell as a valid PUF cell when receiving a first value indicating that the target value TV is greater than the first central value CV1 and does not perform a separate determination on the target PUF cell when receiving a second value indicating that the target value TV is smaller than the first central value CV1. In an exemplary embodiment, information (e.g., address information) about a target PUF cell used to determine the target PUF cell as a valid PUF cell is stored in a separate memory of the controller 101.

In an exemplary embodiment, PUF cells, which are not decided as valid PUF cells, from among the plurality of PUF cells may be managed as invalid PUF cells as illustrated in FIG. 12B. In an exemplary embodiment, invalid PUF cells may indicate PUF cells not selected as a target PUF cell in a target bit determining operation of the PUF cell device 100 afterward.

Figure 13A:
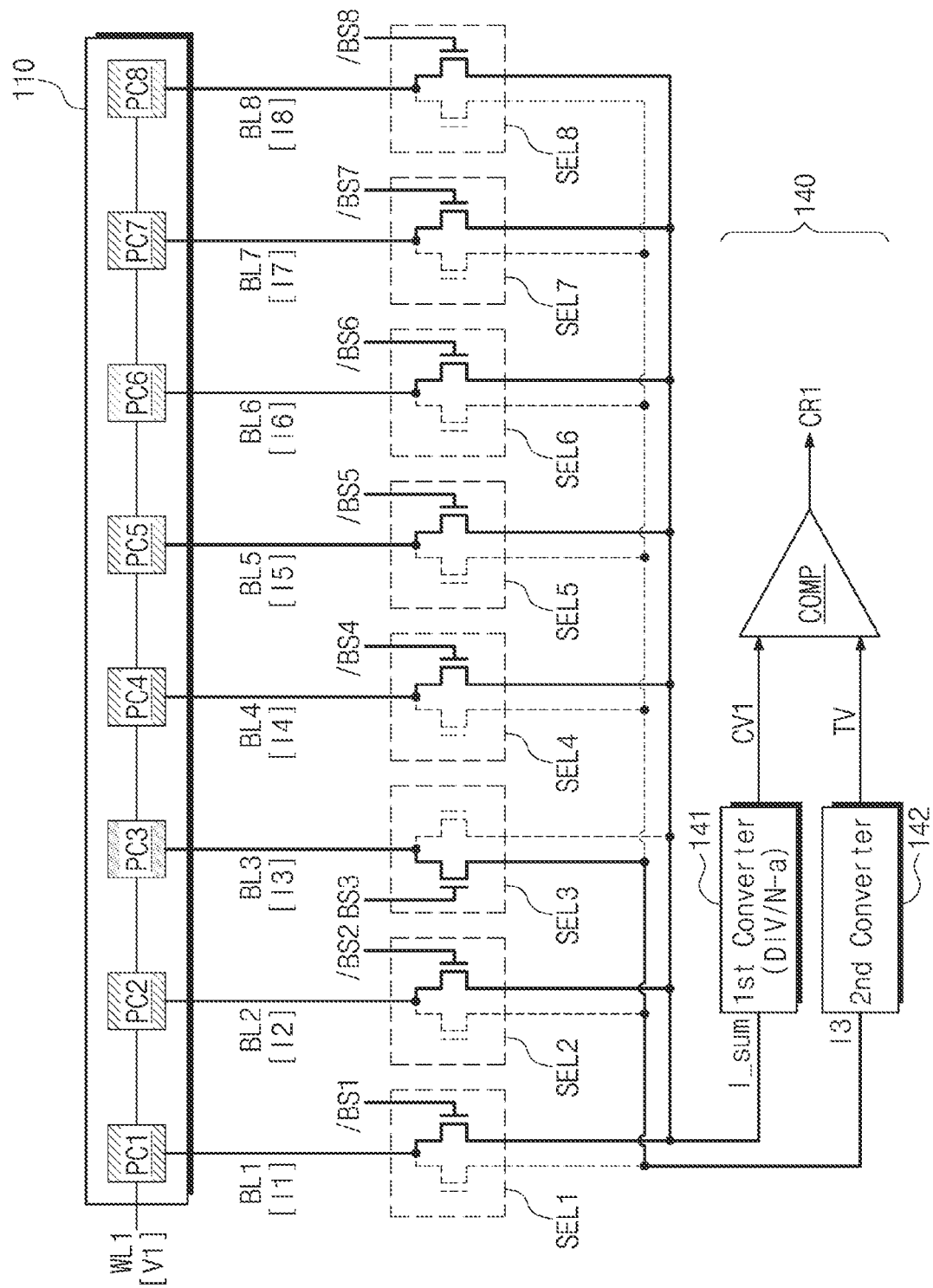
FIGS. 13A and 13B are diagrams for describing an operation according to the flowchart of FIG. 12A.
Figure 13B:
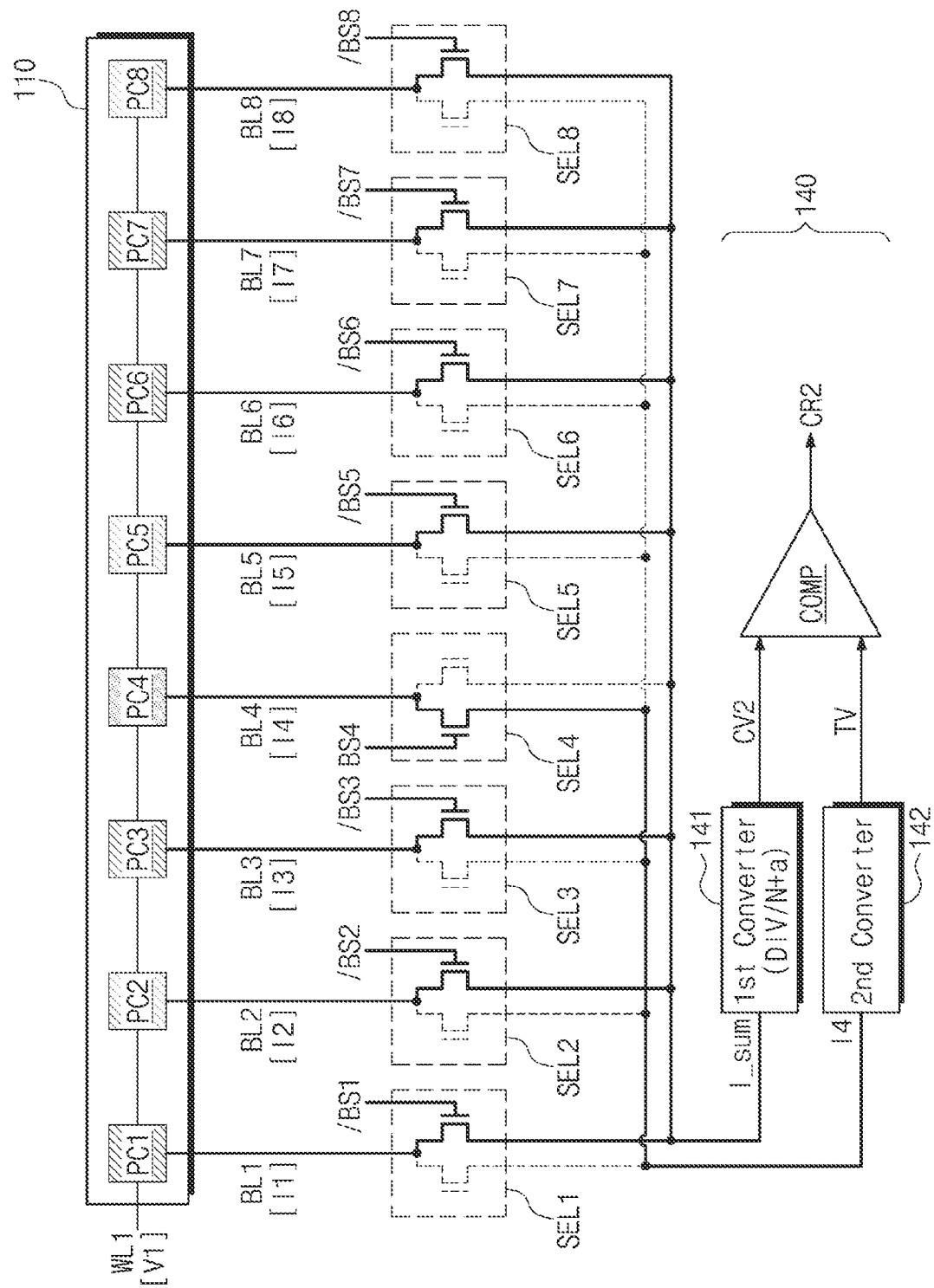

FIGS. 13A and 13B are diagrams for describing an operation according to the flowchart of FIG. 12A. Referring to FIGS. 1, 2 13A, and 13B, the PUF cell device 100 includes the PUF cell array 110, the bit line selector 130, and the bit determiner 140. The PUF cell array 110 includes the plurality of PUF cells PC1 to PC8 connected to the first word line WL1 and the plurality of bit lines BL1 to BL8. The bit line selector 130 includes a plurality of selectors SEL1 to SEL8. The bit determiner 140 includes the first converter 141, the second converter 142, and the comparator COMP. Each component is described above, and thus, additional description are omitted to avoid redundancy.

First, operation S211 to operation S214 of FIG. 12A are described with reference to FIG. 13A. As illustrated in FIG. 13A, the third PUF cell PC3 is selected as a target PUF cell. In this case, as in the above description given with reference to FIG. 8, the first voltage V1 is provided to the first word line WL1, and the first, second, and fourth to eighth selectors SEL1, SEL2, and SEL4 to SEL8 provide the first converter 141 with the sum current I_sum corresponding to a sum of the currents I1, I2, and I4 to I8 of the corresponding bit lines BL1, BL2, and BL4 to BL8 in response to the corresponding inverted bit line selection signals /BS1, /BS2, and /BS4 to /BS8. In response to the third bit line selection signal BS3, the third selector SEL3 provides the third current I3 of the third bit line BL3 to the second converter 142 as a target current.

As described with reference to operation S212 of FIG. 12A, the first converter 141 outputs the first central value CV1 based on the first division ratio (e.g., "N−a"). The second converter 142 outputs the target value TV based on the third current I3. The comparator COMP compares the first central value CV1 and the target value TV to generate a first classification result CR1 and outputs the first classification result CR1.

When a value of the first classification result CR1 is the first value (i.e., when the target value TV is greater than the first central value CV1), the third PUF cell PC3 is decided as a valid PUF cell. In this case, in the distribution of FIG. 12B, the third PUF cell PC3 may be understood as having a value greater than the first central value CV1.

When the value of the first classification result CR1 is the second value (i.e., when the target value TV is not greater than the first central value CV1), the third PUF cell PC3 may be decided as a valid PUF cell or an invalid/unstable PUF cell. For example, as understood from the distribution of FIG. 12B, when the target value TV is not greater than the first central value CV1, the third PUF cell PC3 may be an invalid/unstable PUF cell or a valid/stable PUF cell. In this case, whether the third PUF cell PC3 is a valid PUF cell is not determined.

Valid PUF cells having a target value greater than the first central value CV1 from among the plurality of PUF cells PC1 to PC8 may be decided by performing the operation described with reference to FIG. 13A on each of the plurality of PUF cells PC1 to PC8.

Next, operation S221 to operation S224 of FIG. 12A are described with reference to FIG. 13B. As illustrated in FIG. 13B, the fourth PUF cell PC4 may be selected as a target PUF cell. In this case, each of the plurality of selectors SEL1 to SEL8 may operate in response to the corresponding bit line selection signal or the corresponding inverted bit line selection signal. The operation of the plurality of selectors SEL1 to SEL8 is similar to the operation described above, and thus, additional description will be omitted to avoid redundancy.

Through the operation of the plurality of selectors SEL1 to SEL8, the sum current I_sum corresponding to a sum of the remaining currents other than the fourth current I4 from among the plurality of currents I1 to I8 is provided to the first converter 141, and the fourth current I4 is provided to the second converter 142. The second converter 142 outputs the target value TV based on the fourth current I4.

Unlike the above description with respect to FIG. 13A, the first converter 141 output the second central value CV2 based on the second division ratio (e.g., "N+a"). The comparator COMP compares the second central value CV2 and the target value TV to generate a second classification result CR2 and outputs the second classification result CR2.

When a value of the second classification result CR2 is the second value (i.e., when the target value TV is smaller than the second central value CV2), the fourth PUF cell PC4 is decided as a valid PUF cell. In this case, in the distribution of FIG. 12B, the fourth PUF cell PC4 may be understood as having a value smaller than the second central value CV2.

In an exemplary embodiment, valid PUF cells having a target value smaller than the second central value CV2 from among the plurality of PUF cells PC1 to PC8 may be decided by performing the operation described with reference to FIG. 13B on each of the plurality of PUF cells PC1 to PC8.

In an exemplary embodiment, in the case where the operation described with reference to FIG. 13A is first performed, the operation described with reference to FIG. 13B may be selectively performed depending on a result of the operation described with reference to FIG. 13A. For example, the operation described with reference to FIG. 13B may be performed only on PUF cells not decided as valid PUF cells in the operation described with reference to FIG. 13A. Alternatively, in the case where the operation described with reference to FIG. 13B is first performed, the operation described with reference to FIG. 13A may be performed only on PUF cells not decided as valid PUF cells in the operation described with reference to FIG. 13B.

While the operation of deciding valid PUF cells having a target value greater than the first central value CV1 and the operation of deciding valid PUF cells having a target value smaller than the second central value CV2 are separately illustrated and described, the inventive concept is not limited thereto. For example, the first converter 141 may simultaneously calculate the first central value CV1 based on the first division ratio and the second central value CV2 based on the second division ratio through one conversion operation, and the comparator COMP may simultaneously compare the first and second central values CV1 and CV2 and the target value TV. In this case, whether a target PUF cell is a valid PUF cell may be determined through one sensing operation.

In an exemplary embodiment, whether a target PUF cell is a valid PUF cell may be determined by the controller 101. For example, the controller 101 may perform the operation described with reference to FIG. 13A on each of a plurality of PUF cells of the PUF cell device 100 and may receive a first comparison result (or a first target bit) of each of the plurality of PUF cells. Afterwards, the controller 101 may perform the operation described with reference to FIG. 13B on each of the plurality of PUF cells of the PUF cell device 100 and may receive a second comparison result (or a second target bit) of each of the plurality of PUF cells. The controller 101 may decide valid PUF cells by combining the first comparison results (or the first target bits) and the second comparison results (or the second target bits) and may store address information of the decided valid PUF cells.

Figure 14:
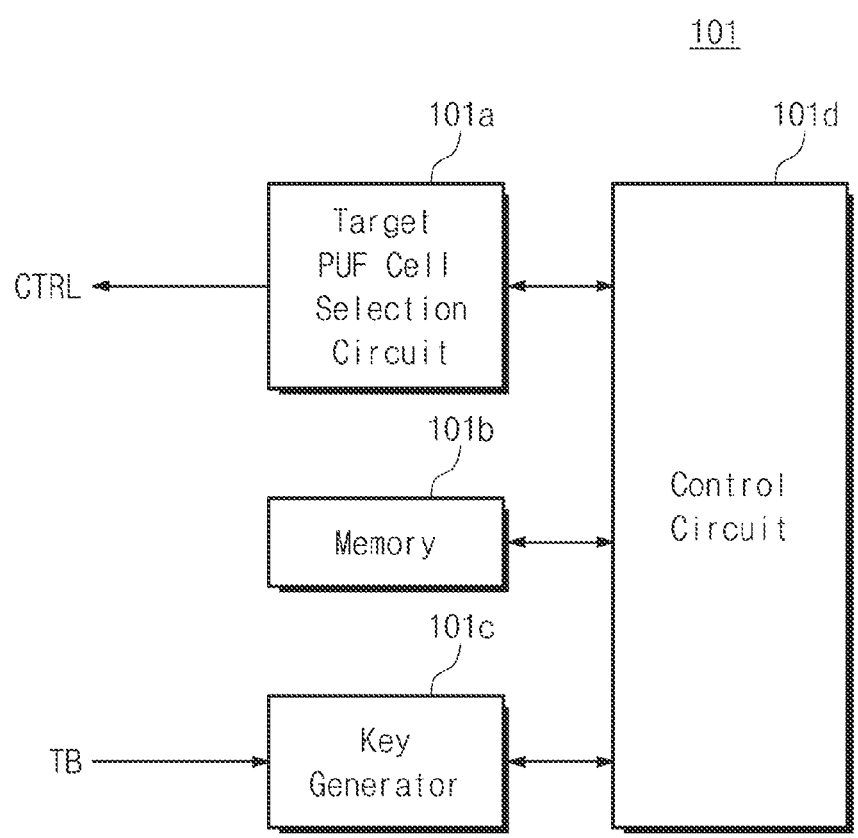
FIG. 14 is a block diagram illustrating a controller of FIG. 1 according to an exemplary embodiment of the inventive concept.

FIG. 14 is a block diagram illustrating a controller of FIG. 1 according to an exemplary embodiment of the inventive concept. Referring to FIGS. 1 and 14, the controller 101 includes a target PUF cell selection circuit 101a, a memory 101b, a security key generator 101c (e.g., a circuit), and a control circuit 101d.

The target PUF cell selection circuit 101a selects a target PUF cell of a plurality of PUF cells included in the PUF cell device 100. The target PUF cell selection circuit 101a may output the control signal CTRL based on the selected target PUF cell. In an exemplary embodiment, the target PUF cell selection circuit 101a is configured to select a target PUF cell of valid PUF cells described with reference to FIGS. 12A to 13B. For example, the memory 101b may include information (e.g., address information) about the valid PUF cells generated through the operations described with reference to FIGS. 12A to 13B. The target PUF cell selection circuit 101a may select a target PUF cell of the valid PUF cells based on the information stored in the memory 101b.

The security key generator 101c receives the target bit TB from the PUF cell device 100. In an exemplary embodiment, the security key generator 101c generates a security key KEY by combining a plurality of target bits TB received from the PUF cell device 100. The generated security key KEY may be provided to an external electronic device or integrated circuit. The control circuit 101d may be configured to control overall operations of the controller 101. The security key KEY may be used to authenticate the PUF cell device 100.

Figure 15:
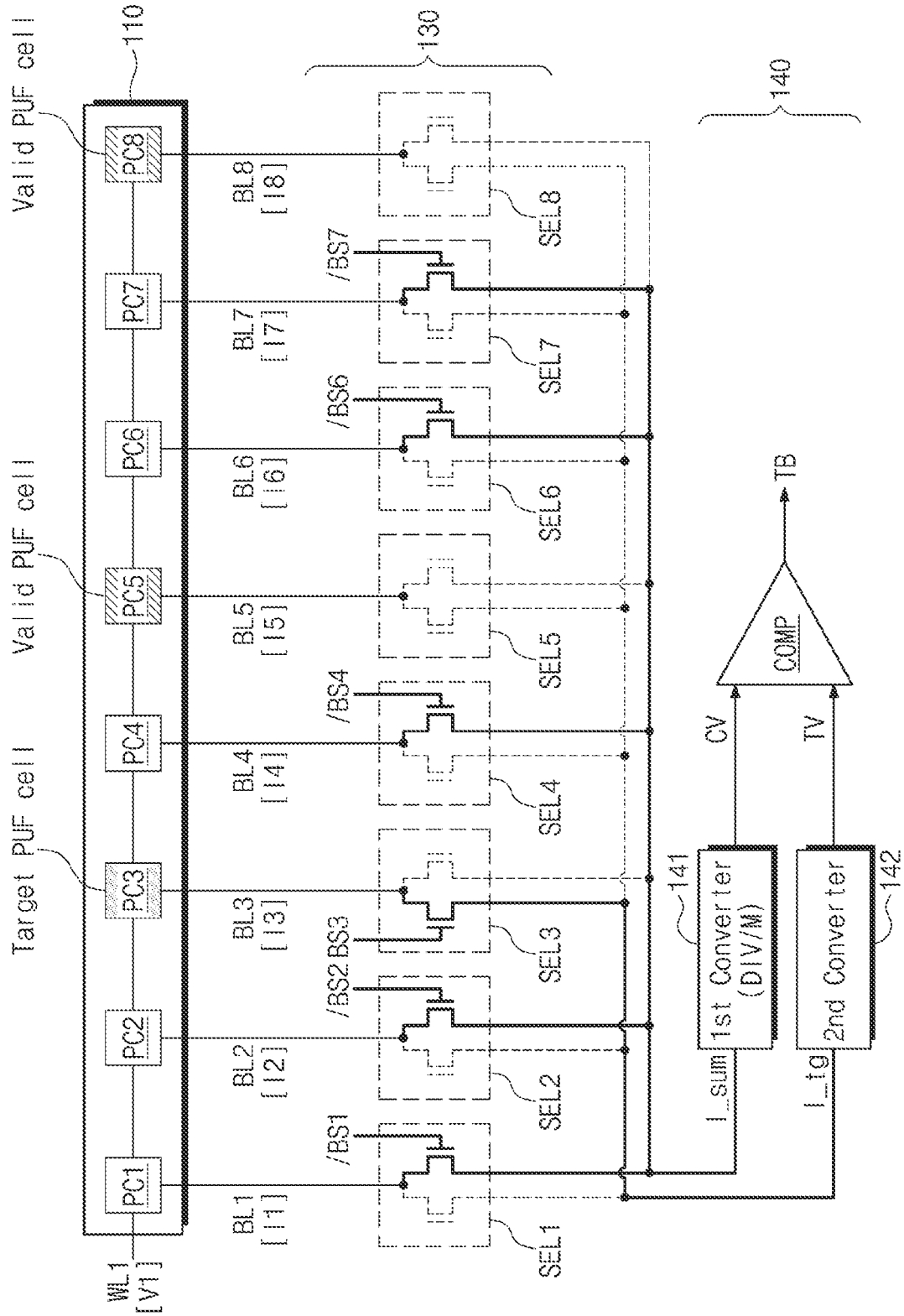
FIG. 15 is a diagram for describing an operation of a PUF cell device according to an exemplary embodiment of the inventive concept.

FIG. 15 is a diagram for describing an operation of a PUF cell device according to an exemplary embodiment of the inventive concept. For convenience of description, an operation based on FIG. 15 will be described with reference to the PUF cell device 100 of FIG. 3 and the controller 101 of FIG. 14. Also, it is assumed that the third, fifth, and eighth PUF cells PC3, PC5, and PC8 of the plurality of PUF cells PC1 to PC8 are decided as valid PUF cells through the operations described with reference to FIGS. 12A to 13B. That is, the controller 101 of FIG. 14 may include information about the valid PUF cells PC3, PC5, and PC8.

Referring to FIGS. 1, 14, and 15, the PUF cell device 100 includes the PUF cell array 110, the bit line selection circuit 130, and the bit determiner 140. The PUF cell array 110 includes the plurality of PUF cells PC1 to PC8 connected to the first word line WL1 and the plurality of bit lines BL1 to BL8. The bit line selection circuit 130 includes a plurality of selectors SEL1 to SEL8. The bit determiner 140 includes the first converter 141, the second converter 142, and the comparator COMP. The components are described above, and thus, additional description are omitted to avoid redundancy.

Unlike an embodiment described above, in the embodiment of FIG. 15, the central value CV is calculated by using some of a plurality of PUF cells connected with a word line of a target PUF cell. For example, in the case where the target PUF cell is the third PUF cell PC3, PUF cells (i.e., invalid/unstable PUF cells), which are not valid PUF cells, from among the plurality of PUF cells PC1 to PC8 connected with the first word line WL1 are used as PUF cells that are used to calculate the central value CV. The invalid PUF cells are PUF cells adjacent to the 0-th central value CV0 as described with reference to FIG. 12B. That is, in the case of calculating the central value CV by using invalid PUF cells, a value more approximate to the 0-th central value CV0 may be obtained. Also, as the number of PUF cells to be used to calculate the central value CV decreases, the total power consumption of the PUF cell device 100 may be reduced. For example, in FIG. 15, the PUF cells PC1, PC2, PC4, PC6, and PC7 are the invalid PUF cells used to generate the sum current I_sum.

Figure 16A:
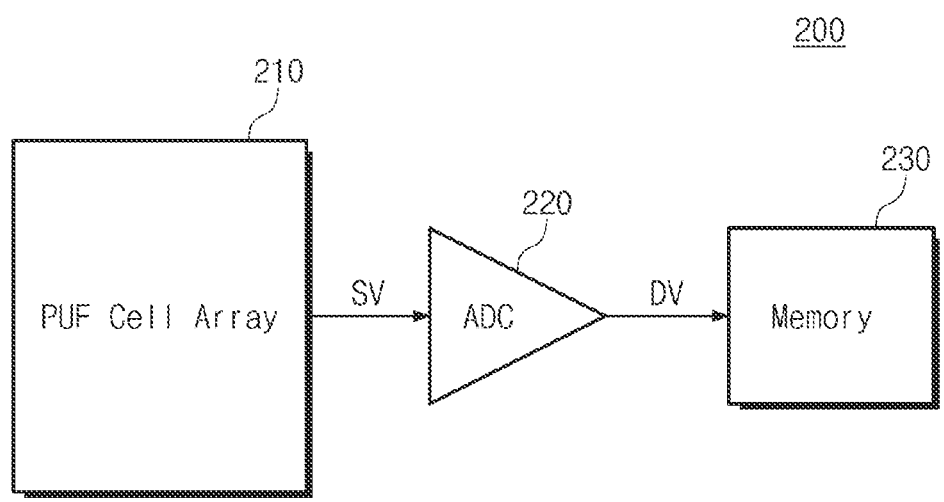
FIG. 16A is a block diagram for describing an operation of a security device according to an exemplary embodiment of the inventive concept.
Figure 16B:
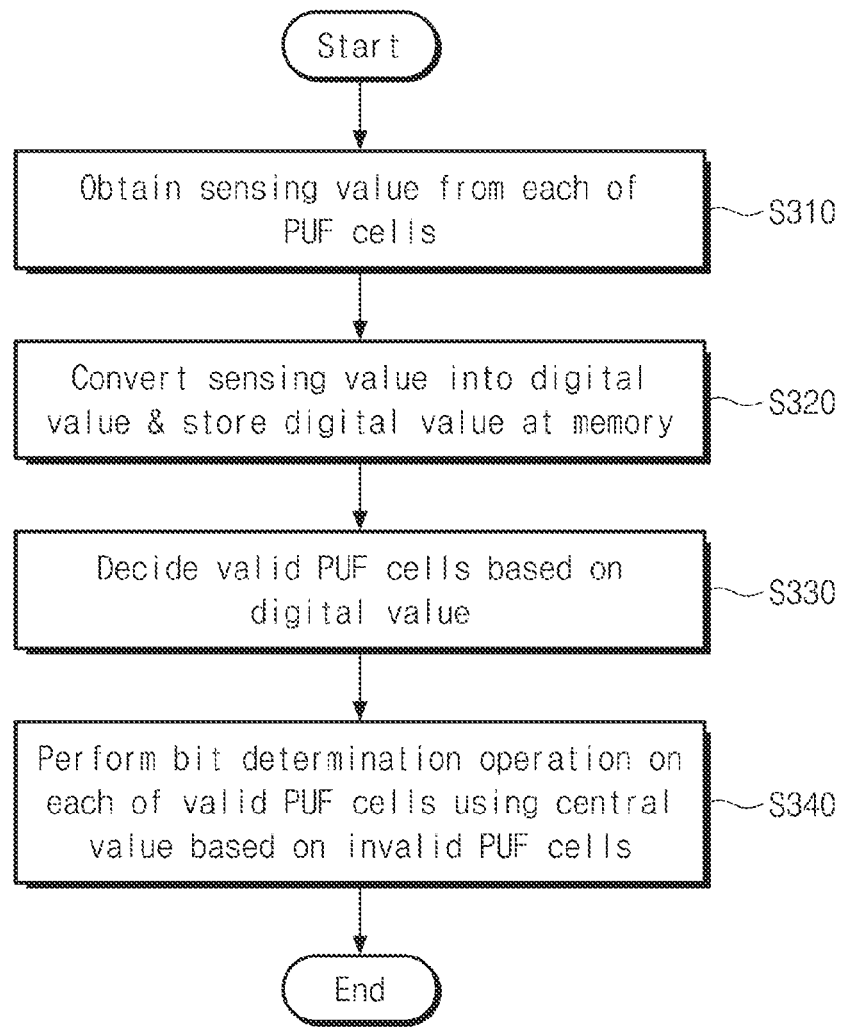
FIGS. 16B and 16C are flowcharts for describing an operation of a security device according to an exemplary embodiment of the inventive concept.
Figure 16C:
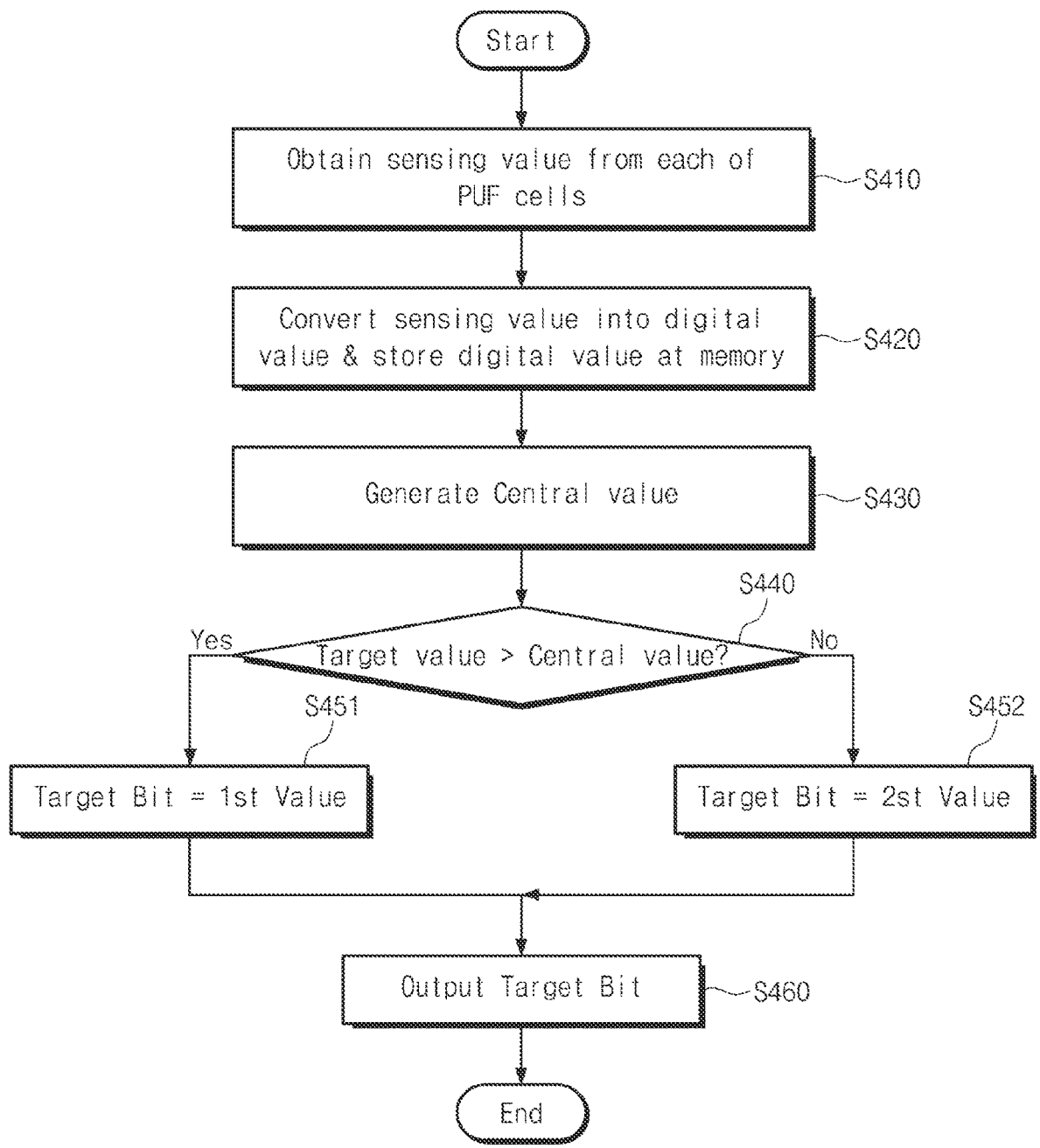

FIG. 16A is a block diagram for describing an operation of a security device according to an exemplary embodiment of the inventive concept, and FIGS. 16B and 16C are flowcharts for describing an operation of a security device according to exemplary embodiments of the inventive concept. Referring to FIGS. 16A and 16B, a security device 200 includes a PUF cell array 210, an analog-to-digital converter 220, and a memory 230. In an exemplary embodiment, the PUF cell array 210 is a PUF cell device or a PUF cell array described with reference to FIGS. 1 to 15.

An operation of the security device 200 of FIG. 16A is described with reference to FIG. 16B. In operation S310 of FIG. 16B, the security device 200 obtains a sensing value of each of a plurality of PUF cells included in the PUF cell array 210. The sensing value may be analog information obtained from each of the plurality of PUF cells.

In operation S320, the security device 200 converts the sensing values SV into a digital value DV and stores the converted digital value DV in the memory 230.

In operation S330, the security device 200 decides valid PUF cells based on the digital value DV stored in the memory 230. For example, as described with reference to FIG. 11, the security device 200 may decide PUF cells corresponding to a digital value greater or smaller than the reference value REF0 as much as a given magnitude from among the digital values DV as valid PUF cells. In an exemplary embodiment, information about the valid PUF cells may be stored in the memory 230.

In operation S340, the security device 200 performs a bit determining operation on each of the valid PUF cells by using a central value that is based on invalid PUF cells. For example, the security device 200 may perform the operation described with reference to FIG. 15 based on information about invalid PUF cells.

In an exemplary embodiment, the security device 200 performs a target bit determining operation described with reference to FIGS. 1 to 15 by using the analog-to-digital converter 220. For example, referring to FIGS. 16A and 16C, in operation S410, the security device 200 obtains a sensing value from each PUF cell. In an exemplary embodiment, the security device 200 obtain sensing values with regard to all the PUF cells. Alternatively, the security device 200 may obtain sensing values from a target PUF cell and PUF cells (e.g., PUF cells used to calculate a central value as described with reference to FIGS. 1 to 15) associated with the target PUF cell.

In operation S420, the security device 200 converts the obtained sensing values into digital values.

In operation S430, the security device 200 may calculate the central value CV. For example, as in the above description, the security device 200 calculates a central value based on digital values corresponding to other PUF cells associated with a target PUF cell. That is, unlike the above embodiments, the security device 200 obtains digital values of other PUF cells associated with target PUF cells and calculates a central value based on the obtained digital values, using the analog-to-digital converter 220.

Afterwards, the security device 200 performs operation S440 to operation S460. In an exemplary embodiment, a substantial operation principle may be similar to the above embodiments of FIG. 6 except that operations of calculating the central value CV and determining a target bit are performed after analog-to-digital conversion using the analog-to-digital converter 220. For example, operation S440 is performed after operation S430, and may be implemented by operation S140 of FIG. 6, operation S451 is performed when operation S440 determines that the target value is greater than the central value CV and may be implemented by operation S151 of FIG. 6, operation S452 is performed when operation S440 determines that the target value is not greater than the central value CV and may be implemented by operation S152, and operation S460 may be performed thereafter and be implemented by operation S160.

As described above, the security device 200 receives the sensing values SV of the plurality of PUF cells from the PUF cell array 210. The security device 200 may convert the sensing values SV of the plurality of PUF cells into the digital values DV through the analog-to-digital converter 220. The digital values DV may be stored in the memory 230 or a separate storage circuit. The security device 200 may calculate the central value CV based on digital values corresponding to at least two or more of the remaining PUF cells other than a target PUF cell from among the digital values DV. In an exemplary embodiment, whenever determining a target bit, the security device 200 may perform the following operations on associated other PUF cells: an operation of obtaining a sensing value and an operation of converting a sensing value into a digital value. Alternatively, a digital value of each of a plurality of PUF cells may be stored in the memory 230, and the security device 200 may calculate a central value by using the digital values stored in the memory 230.

Figure 17:
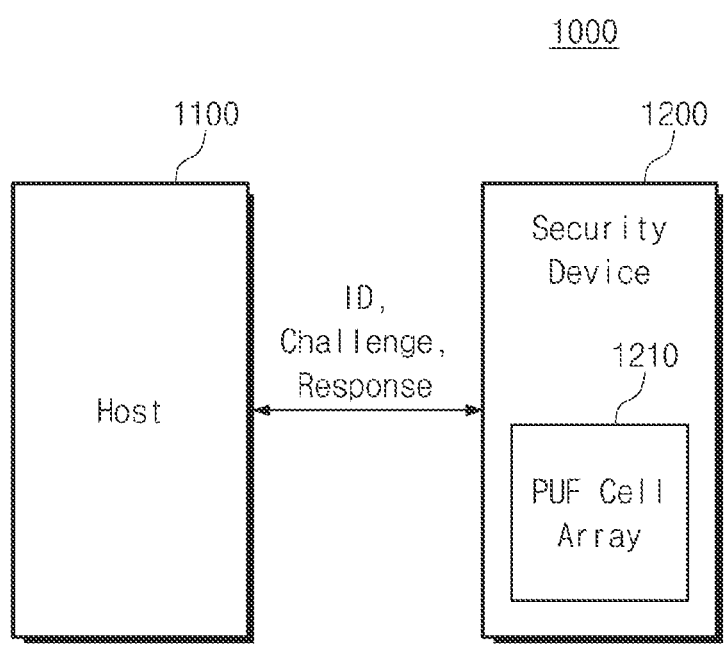
FIG. 17 is a block diagram illustrating an electronic system to which a security device according to an exemplary embodiment of the inventive concept is applied.

FIG. 17 is a block diagram illustrating an electronic system to which a security device according to an embodiment of the inventive concept is applied. Referring to FIG. 17, an electronic system 1000 includes a host 1100 (e.g., a host device) and a security device 1200. The electronic system 1000 may be an electronic device such as a portable communication terminal, a personal digital assistant (PDA), a portable multimedia player (PMP), a smartphone, a digital camera, or a wearable device.

The host 1100 may be configured to control the security device 1200. The security device 1200 includes a PUF cell array 1210 and may be configured to operate under control of the host 1100. In an exemplary embodiment, the security device 1200 is a smart card such as an integrated circuit (IC) card or a chip card or may be a hardware component separately provided to generate a security key.

For example, the host 1100 may receive a device identifier (ID) from the security device 1200. The host 1100 may transmit a challenge to the security device 1200 based on the received device identifier ID. The security device 1200 may transmit a response to the host 1100 in response to the challenge from the host 1100. In an exemplary embodiment, the response includes the security key KEY described with reference to FIGS. 1 to 16. That is, depending on the operation method described with reference to FIGS. 1 to 16, the security device 1200 may obtain data, which is based on the challenge from the host 1100, from a plurality of PUF cells included in the PUF cell array 1210, may generate the response (i.e., a security key) based on the obtained data, and may transmit the response to the host 1100. The host 1100 may perform an authentication operation on the security device 1200 or any other devices based on the received response (e.g., on the security key).

Figure 18:
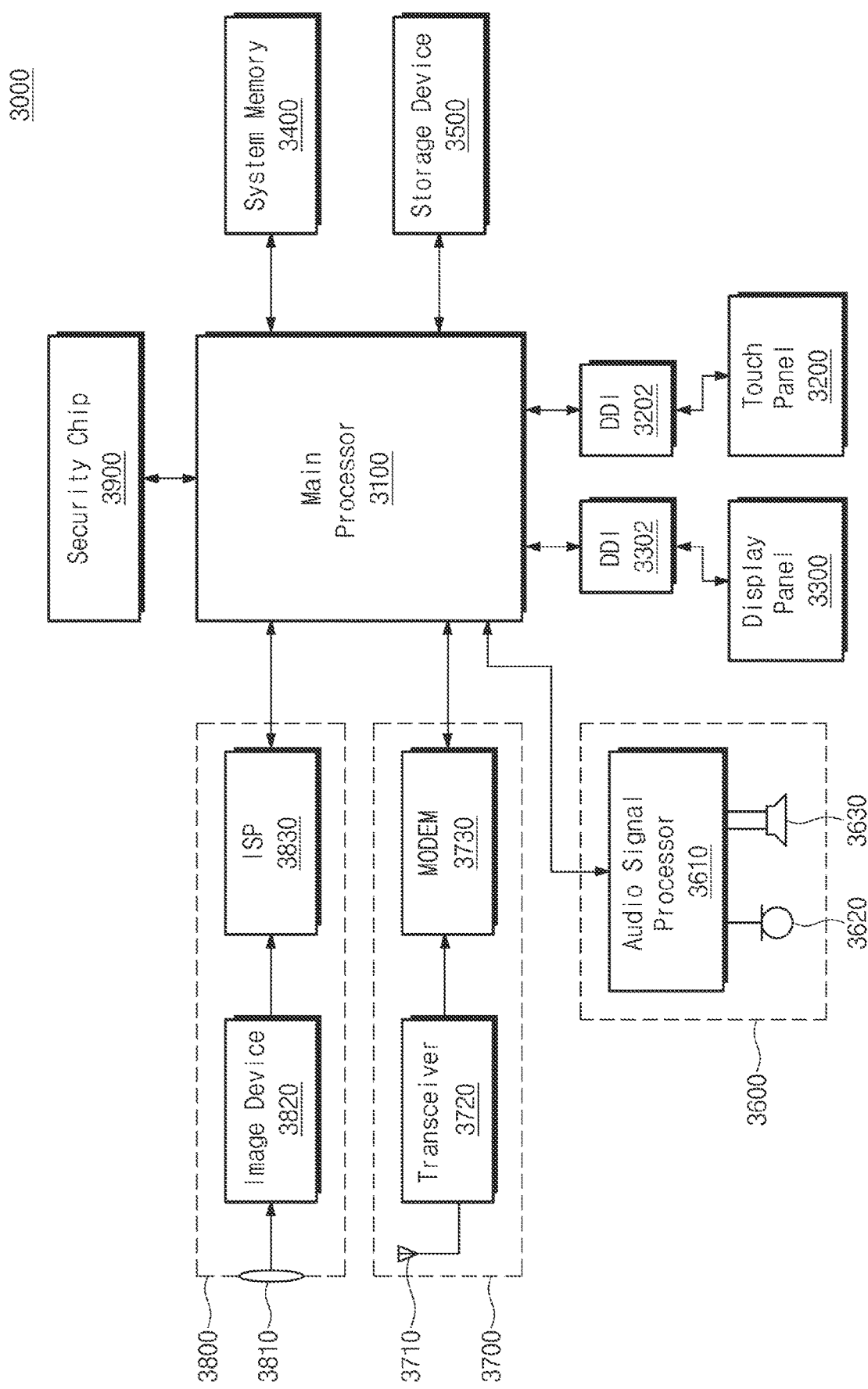
FIG. 18 is a block diagram illustrating an electronic device to which a security device according to an exemplary embodiment of the inventive concept is applied.

FIG. 18 is a block diagram illustrating an electronic device to which a security device according to an exemplary embodiment of inventive concept is applied. Referring to FIG. 18, an electronic device 3000 includes a main processor 3100, a touch panel 3200, a touch driver integrated circuit 3202, a display panel 3300, a display driver integrated circuit 3302, a system memory 3400, a storage device 3500, an image processor 3800, a communication block 3700, an audio processor 3600, and a security chip 3900. In an exemplary embodiment, the electronic device 3000 may be one of various electronic devices such as a portable communication terminal, a personal digital assistant (PDA), a portable media player (PMP), a digital camera, a smartphone, a tablet computer, a laptop computer, and a wearable device.

The main processor 3100 may control overall operations of the electronic device 3000. The main processor 3100 may control/manage operations of the components of the electronic device 3000. The main processor 3100 may process various operations for the purpose of operating the electronic device 3000.

The touch panel 3200 may be configured to sense a touch input from a user under control of the touch driver integrated circuit 3202. The display panel 3300 may be configured to display image information under control of the display driver integrated circuit 3302.

The system memory 3400 may store data that are used for an operation of the electronic device 3000. For example, the system memory 3400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 3500 may store data regardless of whether power is supplied. For example, the storage device 3500 may include at least one of various nonvolatile memories such as a flash memory, a PRAM, an MRAM, a ReRAM, and a FRAM. For example, the storage device 3500 may include an embedded memory and/or a removable memory of the electronic device 3000.

The audio processor 3600 may process an audio signal by using an audio signal processor 3610. The audio processor 3600 may receive an audio input through a microphone 3620 or may provide an audio output through a speaker 3630.

The communication block 3700 may exchange signals with an external device/system through an antenna 3710. A transceiver 3720 and a modulator/demodulator (MODEM) 3730 of the communication block 3700 may process signals exchanged with the external device/system in compliance with at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 3800 may receive light through a lens 3810. An image device 3820 and an image signal processor 3830 included in the image processor 3800 may generate image information about an external object, based on the received light.

The security chip 3900 may be implemented to manage a security operation or an authentication operation associated with the electronic device 3000. In an exemplary embodiment, the security chip 3900 includes a PUF cell device or a security device described with reference to FIGS. 1 to 16.

In an exemplary embodiment, a part of the components of FIG. 18 may be implemented in the form of a system on chip and may be provided as an application processor (AP) of the electronic device 3000.

According to at least one embodiment of the inventive concept, a central value is calculated by using other PUF cells associated with a target PUF cell without separate reference data, and a target bit of the target PUF cell is decided based on the calculated central value. Accordingly, an analog-to-digital converter or reference data is not separately required. This means that circuit complexity of a security device decreases. Also, because a central value optimized for each PUF cell is decided, the reliability of the security device may be improved.

Accordingly, a security device including physical unclonable function (PUF) cells having improved reliability and reduced costs, an operation method of the security device, and an operation method of a physical unclonable function cell device are provided.

While the inventive concept has been described with reference to exemplary embodiments thereof, it will be apparent to those of ordinary skill in the art that various changes and modifications may be made thereto without departing from the spirit and scope of the inventive concept.

What is claimed is:

1. An operation method of a security device including a physical unclonable function (PUF) device, the method comprising:
   selecting a first PUF cell of a plurality of PUF cells as a first sensing PUF cell, the plurality of PUF cells included in the PUF device and connected to a first word line;
   applying a first voltage to the first word line to generate a first sensing value, a first reference value, and a second reference value smaller than the first reference value, the first sensing value corresponding to the first sensing PUF cell, each of the first reference value and the second reference value corresponding to a first group of PUF cells of the plurality of PUF cells that excludes the first PUF cell;
   storing a first address corresponding to the first sensing PUF cell in a memory of a controller, when the first sensing value is smaller than the first reference value or is greater than the second reference value;
   selecting the first PUF cell as a first target PUF cell based on the first address stored in the memory;
   applying, after the selecting the first PUF cell as the first target PUF cell, the first voltage to the first word line to generate a first target value and a first central value, the first target value corresponding to the first target PUF cell, and the first central value corresponding to the first group of PUF cells;
   determining a first target bit of the first target PUF cell based on the first target value and the first central value; and
   generating a security key based on the first target bit in response to an authentication request received from a host device, the security key being configured for use in an authentication operation of the host device.

2. The method of claim 1, wherein the first central value is greater than the first reference value and is smaller than the second reference value.

3. The method of claim 1, wherein the first reference value and the second reference value are generated based on a sum of first currents output from the first group of PUF cells.

4. The method of claim 3, wherein the first central value is generated based on the sum of the first currents output from the first group of PUF cells.

5. The method of claim 1, further comprising:
   selecting a second PUF cell of the plurality of PUF cells as a second sensing PUF cell;
   applying, by the PUF device, the first voltage to the first word line to generate a second sensing value, a third reference value, and a fourth reference value smaller than the third reference value, the second sensing value corresponding to the second sensing PUF cell, the third reference value and the fourth reference value corresponding to a second group of PUF cells of the plurality of PUF cells that excludes the second PUF cell; and
   discarding the second sensing PUF cell, when the second sensing value is greater than the third reference value and is smaller than the fourth reference value.

6. The method of claim 5, wherein the first reference value is different from the third reference value, and the second reference value is different from the fourth reference value.

7. The method of claim 5, wherein the first reference value is obtained by dividing a first sum of first currents output from the first group of PUF cells by a first ratio,
   the second reference value is obtained by dividing the first sum of the first currents output from the first group of PUF cells by a second ratio,
   the third reference value is obtained by dividing a second sum of second currents output from the second group of PUF cells by the first ratio, and
   the fourth reference value is obtained by dividing the second sum of second currents output from the second group of PUF cells by the second ratio.

8. The method of claim 5, wherein a number of the first group of PUF cells is the same with a number of the second group of PUF cells.

9. The method of claim 8, wherein at least one of the first group of PUF cells is different from at least one of the second group of PUF cells.

10. The method of claim 1, wherein the memory is configured to store a plurality of addresses corresponding to valid PUF cells.

11. An operation method of a security device including a physical unclonable function (PUF) device, the method comprising:
    selecting a first target PUF cell from a plurality of PUF cells based on information associated with the first target PUF cell, the information being generated by:
       generating a plurality of sensing values and a plurality of central values from the plurality of PUF cells connected to a first word line;
       comparing the plurality of sensing values to the plurality of central values, respectively; and
       storing an address corresponding to a valid PUF cell based on a result of the comparing the plurality of sensing values to the plurality of central values;
    applying a first voltage to the first word line connected with the first target PUF cell;
    generating a first target value based on a first target current corresponding to operation of the first target PUF cell and generating a first central value based on a sum of first currents output from first PUF cells, connected with the first word line, of the plurality of PUF cells;
    determining a first target bit of the first target PUF cell based on the first target value and the first central value; and generating a security key based on the first target bit for responding to an authentication request received from a host device, the security key being configured for use in an authentication operation of the host device.

12. The method of claim 11, wherein generating a plurality of sensing values and a plurality of central values from the plurality of PUF cells connected to the first word line comprises:
    applying the first voltage to the first word line;
    generating a first sensing value of the plurality of sensing values from a first sensing PUF cell of the plurality of PUF cells and a first central value of the plurality of central values from a first group of PUF cells of the plurality of PUF cells that excludes the first sensing PUF cell; and
    generating a second sensing value of the plurality of sensing values from a second sensing PUF cell of the plurality of PUF cells and a second central value of the plurality of central values from a second group of PUF cells of the plurality of PUF cells that excludes the second sensing PUF cell.

13. The method of claim 12, wherein the comparing the plurality of sensing values to the plurality of central values comprises:
    comparing the first sensing value with a first reference value that is smaller than the first central value;
    comparing the first sensing value with a second reference value that is greater than the first central value; and
    deciding one of:
        the first sensing PUF cell as the valid PUF cell when the first sensing value is smaller than the first reference value or is greater than the second reference value; or
        the first sensing PUF cell as an invalid PUF cell when the first sensing value is greater than the first reference value and is smaller than the second reference value.

14. The method of claim 13, wherein the comparing the plurality of sensing values to the plurality of central values comprises:
    comparing the second sensing value with a third reference value that is smaller than the second central value;
    comparing the second sensing value with a fourth reference value that is greater than the second central value; and
    deciding one of:
        the second sensing PUF cell as the valid PUF cell when the second sensing value is smaller than the third reference value or is greater than the fourth reference value; or
        the first sensing PUF cell as an invalid PUF cell when the second sensing value is greater than the third reference value and is smaller than the fourth reference value.

15. The method of claim 12,
    wherein the first sensing value is different from the second sensing value, and
    wherein the first central value is different from the second central value.

16. The method of claim 14, wherein a ratio between the first reference value and the first central value is the same with a ratio between the third reference value and the second central value, and
    a ratio between the second reference value and the first central value is the same with a ratio between the fourth reference value and the second central value.

17. An operation method of a security device including a physical unclonable function (PUF) device and a controller configured to the PUF device, the method comprising:
    generating a plurality of sensing values and a plurality of central values from a plurality of PUF cells connected to a first word line;
    deciding whether each of the plurality of PUF cells is a valid PUF cell based on a comparison of the plurality of sensing values to the plurality of central values;
    storing, in a memory of the controller, addresses corresponding to one or more of the plurality of PUF cells that are decided as the valid PUF cell;
    selecting a target PUF cell based on the addresses stored in the memory;
    applying a first voltage to the first word line connected with the target PUF cell;
    generating a target value from the target PUF cell and a central value from a first group of PUF cells of the plurality of PUF cells that excludes the target PUF cell;
    determining a first target bit of the target PUF cell based on the target value and the central value; and
    generating a security key based on the first target bit for responding to an authentication request received from a host device.

18. The method of claim 17, wherein the first group of PUF cells includes PUF cells other than the target PUF cell from among the plurality of PUF cells connected to the first word line.

19. The method of claim 17, wherein the first group of PUF cells includes PUF cells, which are determined as an invalid PUF cell, from among the plurality of PUF cells connected to the first word line.

* * * * *